(12) United States Patent
Nielsen-Cole et al.

(10) Patent No.: US 12,296,985 B2
(45) Date of Patent: May 13, 2025

(54) ELECTROSTATIC DEBRIS REMOVAL SYSTEM

(71) Applicant: Orbital Composites, Inc., San Jose, CA (US)

(72) Inventors: Cole Nielsen-Cole, San Jose, CA (US); James M. Frei, Dixon, CA (US)

(73) Assignee: Orbital Composites, Inc.

( * ) Notice: Subject to any disclaimer, the term of this patent is extended or adjusted under 35 U.S.C. 154(b) by 0 days.

(21) Appl. No.: 18/195,929

(22) Filed: May 10, 2023

(65) Prior Publication Data

US 2023/0365278 A1    Nov. 16, 2023

Related U.S. Application Data

(60) Provisional application No. 63/340,455, filed on May 11, 2022.

(51) Int. Cl.
    *B64G 1/10*    (2006.01)
(52) U.S. Cl.
    CPC .................. *B64G 1/1081* (2023.08)
(58) Field of Classification Search
    CPC ....... B64G 1/1081; B64G 1/56; B64G 1/1078
    See application file for complete search history.

(56) References Cited

U.S. PATENT DOCUMENTS

| | | | |
|---|---|---|---|
| 2002/0102406 A1* | 8/2002 | Muthiah | C09D 5/034 428/413 |
| 2011/0036952 A1* | 2/2011 | Moorer, Jr. | F03H 1/0006 244/158.6 |
| 2012/0292449 A1* | 11/2012 | Levin | B64G 1/1081 244/171.1 |
| 2021/0292010 A1* | 9/2021 | Marin | B64G 1/1081 |
| 2023/0415923 A1* | 12/2023 | Scheidegger | B64G 1/6462 |

* cited by examiner

*Primary Examiner* — Brady W Frazier
*Assistant Examiner* — Shanna Danielle Glover

(57) ABSTRACT

A system for collecting debris includes a collector configured to accumulate debris and retain an electrostatic charge; a deployment mechanism configured to move the collector into a path of the debris; an electrostatic charging array comprising one or more wires or plates operatively connected to the collector; and one or more processors operatively coupled to the collector, the deployment mechanism, and the electrostatic charging array. The one or more processors are configured to track debris in relation to the collector; control movement of the collector and the deployment mechanism; and regulate power to the electrostatic charging array.

31 Claims, 8 Drawing Sheets

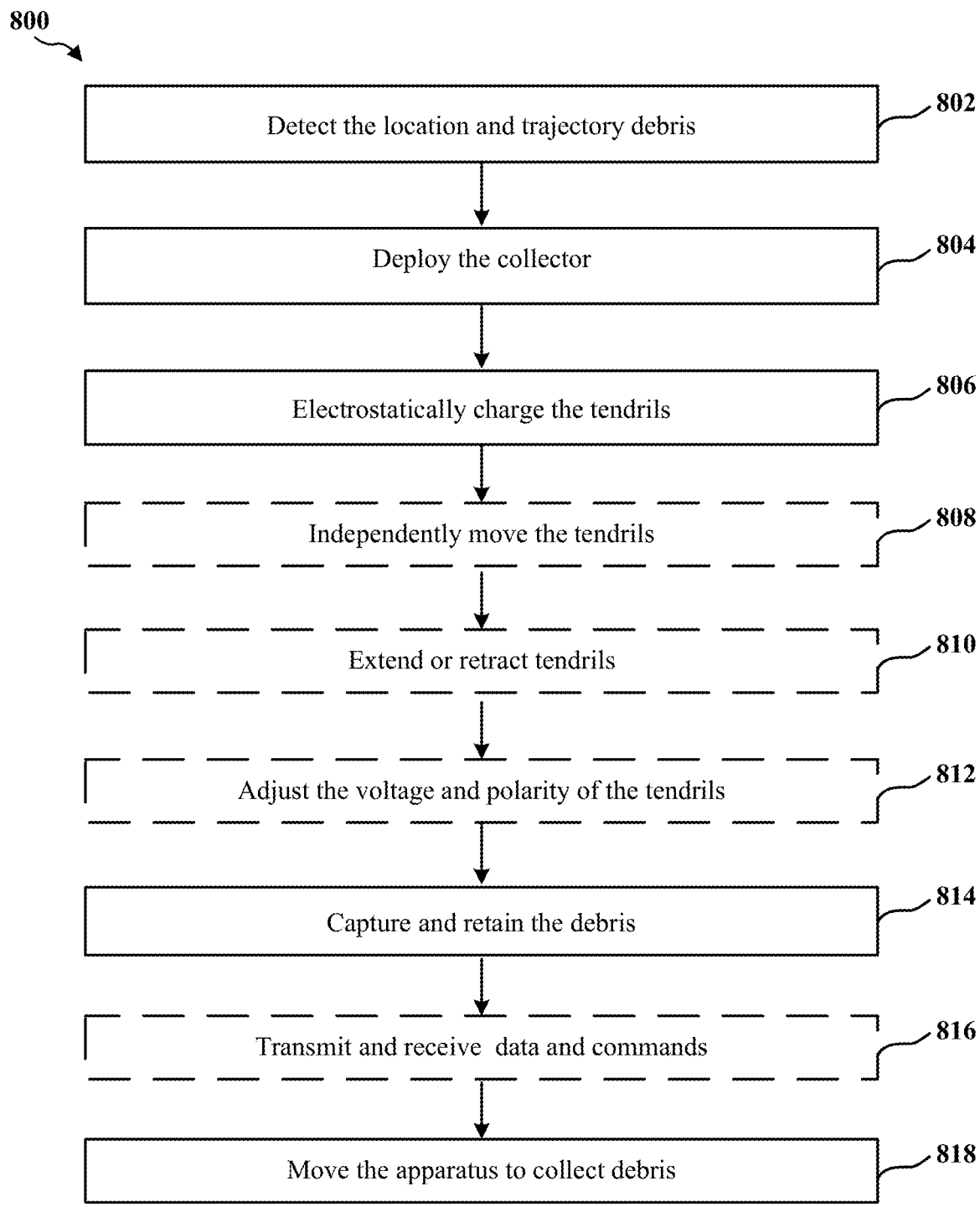

# ELECTROSTATIC DEBRIS REMOVAL SYSTEM

CLAIM OF PRIORITY

The present application claims priority to Provisional Application No. 63/340,455, entitled "Orbital Debris Removal System," filed May 11, 2022, which is hereby incorporated by reference in its entirety.

FIELD

The present disclosure relates to debris mitigation and removal. More specifically, to an apparatus that deploys an electrostatically charged collector to retrieve debris.

BACKGROUND

The problem of space debris has become increasingly pressing over the years. According to NASA, there are currently over 500,000 pieces of debris orbiting the Earth, ranging from fragments to larger objects like spent rocket stages and defunct satellites. This debris poses a serious threat to functioning satellites, spacecraft, and even astronauts in orbit, as collisions can cause catastrophic damage.

Existing methods for mitigating space debris include ground-based lasers, nets, and harpoons, but these methods have their limitations. For instance, ground-based lasers are limited by atmospheric interference, while nets and harpoons may cause additional fragmentation and are not adequate for small debris. There is a need for a more effective method of collecting space debris of all sizes in a way that does not create additional fragments.

BRIEF SUMMARY

The following presents a simplified summary of one or more embodiments in order to provide a basic understanding of the disclosure. This summary is not an extensive overview of all contemplated embodiments and is not intended to either identify key or critical elements of all embodiments or delineate the scope of any or all embodiments. Its purpose is to present some concepts of one or more embodiments in a simplified form as a prelude to the more detailed description that is presented below.

The present disclosure relates to a technique for collecting debris using an electrostatically charged collector with a plurality of tendrils. The collector is designed to detect the location and trajectory of debris using one or more sensors to track the debris in relation to the collector. Once detected, the collector is deployed into the path of the debris, and one or more tendrils of the collector are electrostatically charged to attract the debris to the collector. The collector then captures and retains the debris before discharging it from the apparatus.

The electrostatically charged tendrils of the collector are arranged in a pattern that distributes the electrical charge on the collector to attract the debris more strongly in a first direction than in a second direction. The voltage and polarity of the tendrils can be adjusted to optimize debris accumulation or based on the characteristics of the debris collected. In some embodiments, one or more of the tendrils may be coated with a material to enhance electrostatic charging.

The technique has applications in a variety of contexts, including but not limited to the removal of space debris from Earth's orbit, the cleaning of industrial facilities, and the removal of marine debris from bodies of water. The electrostatically charged collector apparatus is designed to attract debris using a plurality of tendrils that are charged with an electrical charge, which creates an attractive force that draws debris towards the collector. The tendrils are arranged in a pattern that optimizes debris collection, and the voltage and polarity of the tendrils can be adjusted to accommodate different types of debris and optimize collection efficiency. The technique also includes a one or more processors that is capable of prioritizing certain types of debris and controlling the movement of the collector apparatus to increase collection efficiency. In addition, the apparatus is capable of transmitting and receiving operational data and control commands from a remote device, allowing for remote monitoring and control of the collection process.

In some embodiments, the apparatus is affixed to a satellite and controlled by one or more processors that can prioritize the collection of certain types of debris based on pre-programmed criteria. The apparatus as part of the satellite may be moved using a propulsion system to collect debris in a predefined area. One or more tendrils of the collector may be moved independently to optimize debris collection, and one or more of the tendrils may be extendable and retractable based on the characteristics and amount of debris collected.

In some embodiments, the voltage and polarity of the tendrils can be adjusted to form an electrostatic pattern to optimize debris accumulation. The apparatus may also transmit and receive operational data and control commands from a remote device using a transceiver 770 operatively coupled to the collector.

In accordance with some embodiments, an apparatus for collecting debris, comprises: a collector configured to accumulate debris and retain an electrostatic charge; a deployment mechanism configured to move the collector into a path of the debris; an electrostatic charging array comprising one or more wires or plates operatively connected to the collector; and one or more processors operatively coupled to the collector, the deployment mechanism, and the electrostatic charging array, the one or more processors configured to: track debris in relation to the collector; control movement of the collector and the deployment mechanism; and regulate power to the electrostatic charging array.

In some embodiments, the wires or plates are arranged in a pattern that distributes the electrical charge on the collector to attract the debris more strongly in a first direction than in a second direction. In some embodiments, the wires or plates are made of a flexible material that facilitates their movement towards the debris. In some embodiments, the one or more processors are configured to adjust a voltage and polarity of the electrostatic charging array to optimize debris accumulation. In some embodiments, the one or more processors are configured to adjust a voltage and polarity of the electrostatic charging array based on characteristics of the debris collected.

In some embodiments, the collector includes one or more actuators configured to move any one of the one or more wires or plates to enhance debris collection. In some embodiments, the one or more wires or plates are coated with an electrostatic charge enhancing material. In some embodiments, the apparatus further comprises one or more sensors operatively coupled to the one or more processors. The one or more sensors are configured to detect the location and trajectory of the debris and communicate with the one or more processors to activate the deployment mechanism or move the collector. In some embodiments, the deployment mechanism includes one or more actuators configured to position the collector at a predetermined angle and distance from the debris.

In some embodiments, the apparatus further comprises a filter operatively coupled to the collector, the filter is configured to capture and retain collected debris before discharged from the apparatus. In some embodiments, the apparatus further comprises a transceiver operatively coupled to the collector, the transceiver is configured to transmit and receive operational data and control commands from a remote device. In some embodiments, the one or more processors are configured to prioritize collection of certain types of debris based on pre-programmed criteria. In some embodiments, the apparatus further comprises a propulsion system configured to move the apparatus in a predefined area to collect debris.

In accordance with some embodiments, an apparatus for collecting debris, comprises: a collector including a plurality of retractable tendrils configured to accumulate debris and retain an electrostatic charge; a deployment mechanism configured to move the collector into a path of the debris; an electrostatic charging array electrically coupled to the plurality of retractable tendrils; and one or more processors operatively coupled to the collector, the deployment mechanism, and the electrostatic charging array, the one or more processors are configured to: track debris in relation to the collector; control movement of the collector, the retractable tendrils, and the deployment mechanism; and regulate power to the electrostatic charging array.

In some embodiments, one or more retractable tendrils of the plurality of retractable tendrils are configured to extend or retract independently. In some embodiments, one or more retractable tendrils of the plurality of retractable tendrils are configured to extend or retract based on characteristics and amount of debris collected. In some embodiments, the one or more processors are configured to extend or retract one or more retractable tendrils of the plurality of retractable tendrils to form an electrostatic pattern that distributes the electrical charge on the collector to attract the debris more strongly in a first direction than in a second direction.

In some embodiments, the one or more processors are configured to adjust a voltage and polarity of a first retractable tendril of the plurality of retractable tendrils differently from a second retractable tendril of the plurality of retractable tendrils. In some embodiments, the one or more processors are configured to adjust a voltage and polarity of one or more retractable tendrils of the plurality of retractable tendrils to form an electrostatic pattern to optimize debris accumulation. In some embodiments, one or more retractable tendrils of the plurality of retractable tendrils are coated with an electrostatic charge enhancing material.

In some embodiments, the apparatus further comprises one or more sensors electrically coupled to the one or more processors. The one or more sensors are configured to detect the location and trajectory of the debris and communicate with the one or more processors to activate the deployment mechanism, extend or retract one or more retractable tendrils of the plurality of retractable tendrils, or adjust the voltage and polarity of one or more retractable tendrils of the plurality of retractable tendrils. In some embodiments, the deployment mechanism includes one or more actuators configured to position the collector at a predetermined angle and distance from the debris.

In some embodiments, the apparatus further comprises a filter operatively coupled to the collector. The filter is configured to capture and retain collected debris before being discharged from the apparatus. In some embodiments, the apparatus further comprises a transceiver operatively connected to the collector and is configured to transmit and receive operational data and control commands from a remote device. In some embodiments, the one or more processors are further configured to prioritize collection of certain types of debris based on pre-programmed criteria. In some embodiments, the apparatus further comprises a propulsion system configured to move the apparatus in a predefined area to collect debris.

In accordance with some embodiments, an apparatus for collecting debris, comprises: a collector including a plurality of retractable tendrils configured to accumulate debris and retain an electrostatic charge; a deployment mechanism configured to move the collector into a path of the debris; an electrostatic charging array electrically coupled to the plurality of retractable tendrils; and one or more processors operatively coupled to the collector, the deployment mechanism, and the electrostatic charging array, The one or more processors are configured to track debris in relation to the collector; control movement of the collector, the retractable tendrils, and the deployment mechanism; and regulate power to the electrostatic charging array.

In accordance with some embodiments, an apparatus for collecting debris, comprises: a collector comprising a plurality of flexible tendrils, each of which has one or more actuators for independent movement in at least three orthogonal directions, and is configured to accumulate debris; a deployment mechanism configured to move the collector into a path of the debris; an electrostatic charging array electrically coupled to the plurality of flexible tendrils; and one or more processors operatively coupled to the collector, the deployment mechanism, and the electrostatic charging array, the one or more processors are configured to: track debris in relation to the collector; control movement of the collector, the plurality of flexible tendrils, and the deployment mechanism; and regulate power to the electrostatic charging array.

In some embodiments, the collector comprises a plurality of retractable and extendable flexible tendrils. In some embodiments, one or more of the retractable and extendable flexible tendrils are configured to extend or retract independently. In some embodiments, one or more of the retractable and extendable flexible tendrils are configured to extend or retract based on characteristics and amount of debris being collected. In some embodiments, the one or more processors are configured to extend or retract one or more of the retractable and extendable flexible tendrils to form an electrostatic pattern that distributes the electrical charge on the collector to attract the debris more strongly in a first direction than in a second direction.

In some embodiments, the apparatus further comprises one or more sensors electrically coupled to the one or more processors. The one or more sensors being configured to detect location and trajectory of the debris and communicate with the one or more processors to activate the deployment mechanism, extend or retract one or more of the retractable and extendable flexible tendrils, or adjust a voltage and polarity of one or more of the flexible tendrils. In some embodiments, the one or more processors are configured to adjust a voltage and polarity of any one of the plurality of flexible tendrils independently. In some embodiments, the one or more processors are configured to adjust a voltage and polarity of one or more of the flexible tendrils to form an electrostatic pattern to optimize debris accumulation. In some embodiments, one or more of the flexible tendrils are coated with an electrostatic charge enhancing material.

In some embodiments, the deployment mechanism comprises one or more actuators configured to position the collector at a predetermined angle and distance from the debris. In some embodiments, the apparatus further comprises a filter operatively coupled to the collector. The filter is configured to capture and retain collected debris before being discharged from the apparatus. In some embodiments, the apparatus further comprises a transceiver operatively coupled to the collector. The transceiver is configured to transmit and receive operational data and control commands from a remote device. In some embodiments, the one or more processors are configured to prioritize collection of certain types of debris based on pre-programmed criteria. In some embodiments, the apparatus further comprises a propulsion array configured to move the apparatus within a predefined area to collect debris.

In accordance with some embodiments, a method for collecting debris using a collector with a plurality of tendrils comprises: detecting location and trajectory of the debris using one or more sensors to track the debris in relation to the collector; deploying the collector into a path of the debris; electrostatically charging one or more tendrils of the plurality of tendrils to attract the debris to the collector; and capturing and retaining the debris before discharging from the collector.

In some embodiments, the one or more tendrils are arranged in a pattern that distributes the electrical charge on the collector to attract the debris more strongly in a first direction than in a second direction. In some embodiments, a voltage and polarity of the one or more tendrils of the plurality of tendrils are adjusted to optimize debris accumulation. In some embodiments, a voltage and polarity of the one or more tendrils of the plurality of tendrils are adjusted based on characteristics of the debris being collected. In some embodiments, one or more tendrils of the plurality of tendrils are coated with a material to enhance electrostatic charging.

In some embodiments, the method further comprises prioritizing collection of certain types of debris based on pre-programmed criteria. In some embodiments, the method further comprises moving the collector using a propulsion system to collect debris in a predefined area. In some embodiments, the method further comprises moving one or more tendrils of the plurality of tendrils independently to optimize debris collection. In some embodiments, one or more of the plurality of tendrils are extendable and retractable based on characteristics and amount of debris being collected. In some embodiments, a voltage and polarity of the one or more tendrils of the plurality of tendrils are adjusted to form an electrostatic pattern to optimize debris accumulation.

In some embodiments, one or more of the one or more tendrils of the plurality of tendrils are extendable and retractable. In some embodiments, the one or more tendrils of the plurality of tendrils are extended or retracted based on characteristics and amount of debris being collected. In some embodiments, the method further comprises extending or retracting the one or more tendrils of the plurality of tendrils to form an electrostatic pattern that distributes the electrical charge on the collector to attract the debris more strongly in a first direction than in a second direction.

In some embodiments, the method further comprises adjusting a voltage and polarity of a first set of tendrils of the plurality of tendrils different from a second set of tendrils of the plurality of tendrils. In some embodiments, electrostatically charging one or more tendrils of the plurality of tendrils further comprises adjusting a voltage and polarity of the one or more tendrils of the plurality of tendrils to form an electrostatic pattern to optimize debris accumulation. In some embodiments, the method further comprises transmitting and receiving operational data and control commands from a remote device using a transceiver operatively coupled to the collector.

Although, the focus of the present disclosure is on space environments, where space debris poses a significant hazard to active satellites, space vehicles, and astronauts, it should be appreciated that the technique is also useful for other environments, such as aquatic or terrestrial environments, where debris accumulation can cause significant ecological and economic damage such as cleaning up oil spills, collecting pollutants in the ocean, and removing debris from construction sites.

BRIEF DESCRIPTION OF THE FIGURES

For a better understanding of the various described aspects, reference should be made to the description below, in conjunction with the following figures in which like-referenced numerals refer to corresponding parts throughout the figures.

FIG. 8 is a flow chart that illustrates the steps involved in collecting debris using an electrostatically charged collector with a plurality of tendrils.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. It will be apparent to those skilled in the art that these concepts may be practiced without these specific details.

Figure 1:
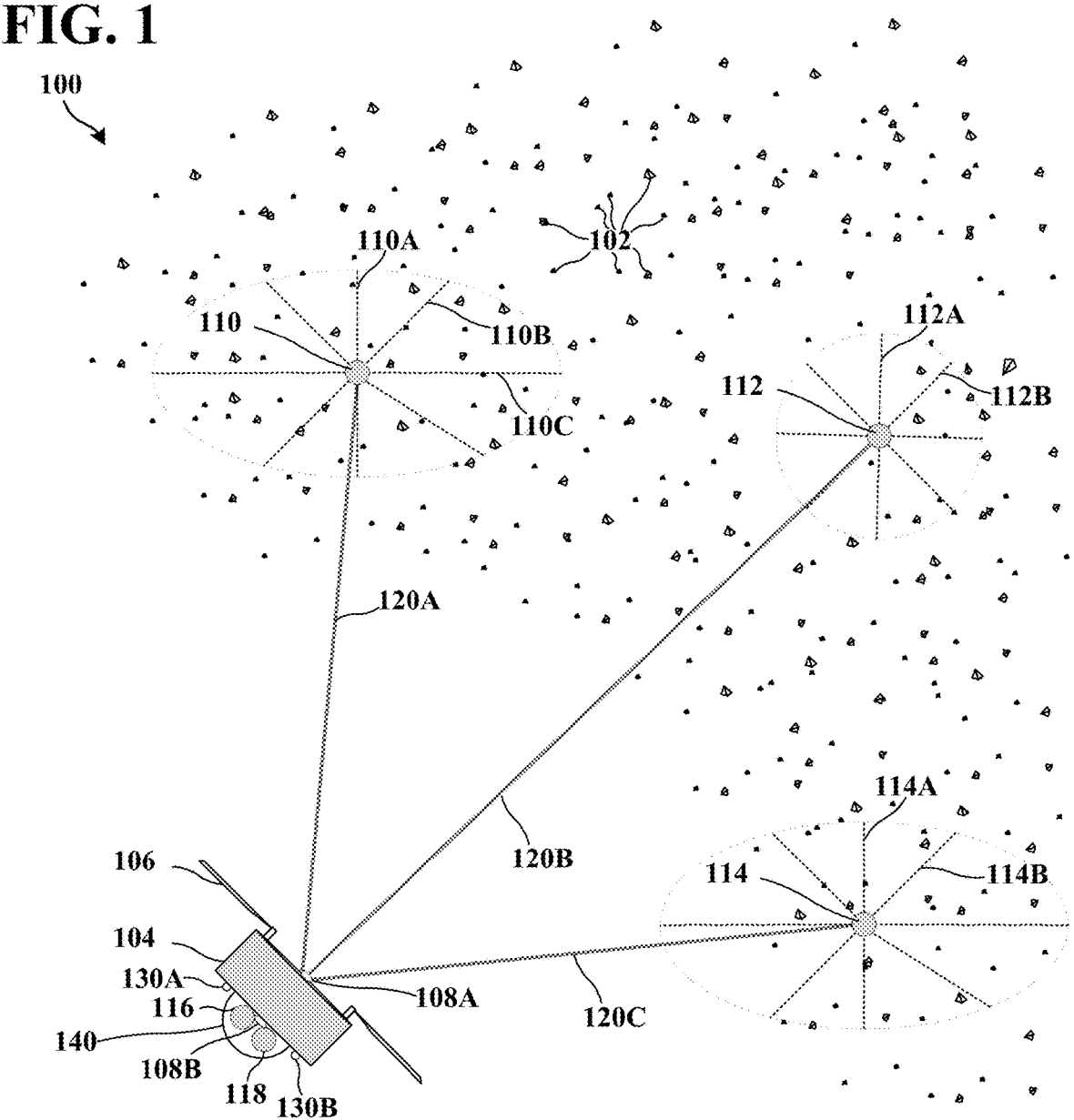
FIG. 1 illustrates a debris collection system with a plurality of collectors each having a plurality of tendrils deployed into the path of detected debris.

FIG. 1 illustrates a debris collection system with a plurality of collectors (e.g., 110, 112, and 114) each having a plurality of tendrils (e.g., first set of tendrils 110A, 110B, 110C, second set of tendrils 112A, 112B, and third set of tendrils 114A, 114B) deployed into the path of detected debris 102. The deployment mechanisms 108A of the apparatus 104 deployed a first collector 110, a second collector 112, and a third collector 114 of the plurality of collectors into the path of the debris 102. In some embodiments, the apparatus 104 includes a plurality of deployment mechanisms. For example, apparatus 104 includes a second deployment mechanism 108B that has not deployed any of its respective collectors (e.g., fourth collector 116 and fifth collector 118) and is located on the opposite side of the apparatus 104 with respect to deployment mechanisms 108A and the respective collectors (e.g., fourth collector 116 and fifth collector 118) are secured to the apparatus 104, as depicted in FIG. 1.

The deployment mechanisms (e.g., 108A and 108B) of the collectors (e.g., 110, 112, and 114) take on various forms depending on the specific application and requirements of the apparatus. In some embodiments, the deployment mechanisms (e.g., 108A and 108B) include one or more actuators configured to position each collector (e.g., 110, 112, and 114) at a predetermined angle and distance from the debris 102. For example, in some embodiments the deployment mechanisms (e.g., 108A and 108B) implements one or more robotic arms as actuators capable of grasping and releasing the collectors (e.g., 110, 112, and 114). The robotic arms are controlled by an automated system, a central computer on the apparatus 104 (e.g., satellite), or remotely by a ground-based operator on the earth.

In some embodiments, the deployment mechanisms (e.g., 108A and 108B) implement pneumatic or hydraulic actuators to extend and retract the collectors (e.g., 110, 112, and 114). These pneumatic or hydraulic actuators are controlled by an automated system, a central computer on the apparatus 104 (e.g., satellite), or remotely by a ground-based operator on the earth. In some embodiments, the deployment mechanisms (e.g., 108A and 108B) implement spring-loaded mechanisms as actuators that are triggered when the apparatus 104 (e.g., satellite) detects debris within reach of the apparatus 104 (e.g., satellite). The spring-loaded mechanism launches the collectors (e.g., 110, 112, and 114) into the path of the debris. In some embodiments, the deployment mechanisms (e.g., 108A and 108B) implement magnetic systems as actuators to attract and secure the collectors (e.g., 110, 112, and 114). The magnetic systems are activated and deactivated as desired by an automated system, a central computer on the apparatus 104 (e.g., satellite), or remotely by a ground-based operator on the earth. In some embodiments, the deployment mechanisms (e.g., 108A and 108B) implement electrostatic systems to attract and secure the collectors (e.g., 110, 112, and 114). In some embodiments, the deployment mechanisms (e.g., 108A and 108B) implement magnetic (e.g., systems (e.g., permanent magnet, electromagnet, etc.,) to attract and secure the collectors (e.g., 110, 112, and 114). The magnetic systems and the electrostatic systems are activated and deactivated as desired.

In some embodiments, the deployment mechanisms (e.g., 108A and 108B) implement thrusters (e.g., thruster 130A, thruster 130B). The thrusters (e.g., thruster 130A, thruster 130B) provide propulsion to maneuver the collectors (e.g., 110, 112, and 114) into a desired position and maintain a position while collecting debris 102. This is particularly useful in situations where the debris 102 is moving quickly and the collectors (e.g., 110, 112, and 114) must adjust their position quickly to intercept the debris 102. In some embodiments, the thrusters (e.g., thruster 130A, thruster 130B) move the collectors (e.g., 110, 112, and 114) back to the apparatus 104 (e.g., satellite) or to a designated collection point once the collectors (e.g., 110, 112, and 114) have collected a predetermined amount of debris 102.

In addition to the deployment mechanisms (e.g., 108A and 108B), the apparatus 104 is equipped with an electrostatic charging array that delivers an electrostatic charge to the plurality of tendrils (e.g., first set of tendrils 110A, 110B, 110C, second set of tendrils 112A, 112B, and third set of tendrils 114A, 114B). In some embodiments, the electrostatic charging array includes one or more wires or plates (e.g., first coupler 120A, second coupler 120B, and third coupler 120C) operatively connected to the collectors (e.g., 110, 112, and 114). In some embodiments, the electrostatic charging array includes couplers 120A, 102B, 120C that connect the first collector 110, second collector 112, and third collector 114 to the apparatus 104 ensure that the collectors (110, 112, 114) are fastened to the apparatus 104 and receive power for operation. For example, as depicted in FIG. 1, the first coupler 120A, the second coupler 120B, and the third coupler 120C are electrically connected the first collector 110, the second collector 112, and the third collector 114, respectively. Electrical power for the electrostatic charging array is provided using solar panels 106 and batteries (not shown). It should be appreciated that other technique can be implemented to generate and transmit power such as solar panels, small nuclear reactor, a magnet generator and the like.

As depicted in FIG. 1, the first coupler 120A, the second coupler 120B, and the third coupler 120C attach the first collector 110, second collector 112, and third collector 114 to the apparatus 104, which beneficially reduces the likelihood of an untethered remote or thruster-based collector being inadvertently jettison and becoming part of the debris 102. As such, the couplers (120A, 120B, 120C) help ensure that the collectors (e.g., 110, 112, and 114) remain connected to the apparatus 104 and are properly controlled, allowing for more precise targeting and collection of debris 102.

In some embodiments, the first coupler 120A, the second coupler 120B, and the third coupler 120C are not electrically connected to the first collector 110, the second collector 112, and the third collector 114, respectively. For example, in some embodiments the first collector 110, the second collector 112, and the third collector 114 are remote apparatuses (e.g., drones) with a transceiver 770, thrusters (e.g., thruster 130A, thruster 130B), and batteries that provide power to electrically charge the plurality of tendrils (e.g., first set of tendrils 110A, 110B, 110C, second set of tendrils 112A, 112B, and third set of tendrils 114A, 114B) of the electrostatic charging array.

One or both of the plurality of tendrils (e.g., first set of tendrils 110A, 110B, 110C, second set of tendrils 112A, 112B, and third set of tendrils 114A, 114B) and the collectors (e.g., 110, 112, and 114) include one or more sensors (e.g., position sensors 720, remote position sensors 756, etc.) that are operatively coupled to the one or more processors 710. The one or more sensors (e.g., position sensors 720, remote position sensors 756, etc.) are configured to detect the location and trajectory of the debris 102 and communicate the sensory data with one or more processors 710 to activate the deployment mechanisms (e.g., 108A and 108B) or move the collectors (e.g., 110, 112, and 114). In particular, the one or more sensors are used to track the debris 102 in relation to the collectors (e.g., 110, 112, and 114) and to deploy the collectors (e.g., 110, 112, and 114) into the path of the detected debris 102. In some embodiments, the one or more sensors include position sensors 720 (e.g., imaging device, optical/infrared/ultraviolet camera, lidar, radar, optical or acoustic, etc.). In some embodiments, the one or more sensors include environmental sensors (e.g., temperature sensors, pressure sensor, humidity sensors, etc.). In some embodiments, the position sensors 720 corresponds to infrared sensors, laser sensors, or radar sensors, and the like.

In some embodiments, multiple types of infrared sensors are concurrently implemented. For example, in some instances a heat sensor is implemented to detect the heat signature of debris 102, while laser sensors are implemented to detect the distance and size of debris 102. Additionally, radar sensors may be used to detect the speed and trajectory of debris. In some embodiments, the range, sensitivity, and frequency response of the one or more sensors are adjusted based on the characteristics of the debris 102 being targeted for collection. For example, larger debris 102 are tracked with sensors configured for longer range and higher sensitivity, while smaller debris 102 are tracked with sensors configured for shorter range and more precise frequency response. The data from multiple sensors are combined and processed to provide a more accurate and complete picture of the debris trajectory and location. In some embodiments, the data is analyzed in real-time to optimize the movement and positioning of the collectors (e.g., 110, 112, and 114) and tendrils, as well as adjust the electrical charge and configuration of the tendrils. In some embodiments, the sensor data is processed using machine learning to improve the accuracy of debris detection and tracking. For example, the machine learning includes analyzing patterns in the sensor data to predict the trajectory of debris 102 and adjust the collectors (e.g., 110, 112, and 114) accordingly.

It should be appreciated that the one or more sensors can be mounted at various angles and positions to optimize the detection of debris 102. For example, in some embodiments the one or more sensors are mounted on at least one of the top, bottom, and sides of the collectors (e.g., 110, 112, and 114). In some embodiments the one or more sensors are mounted on at least one of the top, bottom, and sides of the apparatus 104. In some embodiments the one or more sensors are mounted on at least one of the top, bottom, and sides a tendril (e.g., first set of tendrils 110A, 110B, 110C, second set of tendrils 112A, 112B, and third set of tendrils 114A, 114B). In some embodiments the one or more sensors are embedded in the collectors (e.g., 110, 112, and 114) or tendrils (e.g., first set of tendrils 110A, 110B, 110C, second set of tendrils 112A, 112B, and third set of tendrils 114A, 114B).

Apparatus 104 further includes one or more processors 710 that are operatively coupled to the collectors (e.g., 110, 112, and 114), the deployment mechanisms (e.g., 108A and 108B), and the electrostatic charging array (e.g., the first coupler 120A, the second coupler 120B, and the third coupler 120C). In some embodiments, the one or more processors 710 correspond to at least one of a microprocessor, an embedded processor, a digital signal processor, a graphical processing unit (GPU), and central processing unit (CPU). The one or more processors 710 are configured to track (e.g., tracker 712) the position of the debris 102 in relation to the collectors (e.g., 110, 112, and 114). Position tracking involves analyzing data received from position sensors 720 on the collectors (e.g., the first coupler 120A, the second coupler 120B, and the third coupler 120C) or apparatus 104 and using the location information to determine the precise location, size, and trajectory of debris 102. By tracking debris 102, the processors 710 direct the deployment mechanisms (e.g., 108A and 108B) to move a collector (e.g., the first coupler 120A, the second coupler 120B, and the third coupler 120C) into the path of the debris 102 and capture the debris 102 using the electrostatic tendrils (e.g., first set of tendrils 110A, 110B, 110C, second set of tendrils 112A, 112B, and third set of tendrils 114A, 114B). In some embodiments, the one or more processors 710 0 are configured to prioritize the collection of certain types of debris 102 based on pre-programmed criteria.

The one or more processors 710 are also configured to control (e.g., collector controller 714) the movement of the collector (e.g., 110, 112, and 114) and the deployment mechanisms (e.g., 108A and 108B). Controlling the movement of the collector includes analyzing data from the position sensors 720 and issuing commands to movement actuators such as the thrusters (e.g., thruster 130A, thruster 130B) to move the apparatus 104 and the collectors (e.g., 110, 112, and 114) to different locations. In some embodiments, the processors 710 are configured to control the deployment mechanisms (e.g., 108A and 108B) to release or retract collectors (e.g., 110, 112, and 114) as desired.

In some embodiments, the one or more processors 710 are configured to regulate power (e.g., power regulator 718) to the electrostatic charging array (e.g., the first coupler 120A, the second coupler 120B, and the third coupler 120C). Regulating power (e.g., power regulator 718) to the electrostatic charging array (e.g., the first coupler 120A, the second coupler 120B, and the third coupler 120C) involves monitoring the power supply from the solar panels 106 and batteries (not shown) and adjusting the amount of power supplied to the electrostatic charging array as desired. In regulating power to the electrostatic charging array, the processors 710 ensure that the collectors (e.g., 110, 112, and 114) are charged to the correct voltage and polarity, facilitating the capture of debris 102 more efficiently. In some embodiments, the one or more processors 710 are configured to adjust the voltage and polarity of the electrostatic charging array (e.g., the first coupler 120A, the second coupler 120B, and the third coupler 120C) to optimize debris accumulation. In some embodiments, the one or more processors 710 are configured to adjust the voltage and polarity of the electrostatic charging array based on characteristics of the debris 102 being collected.

Figure 2:
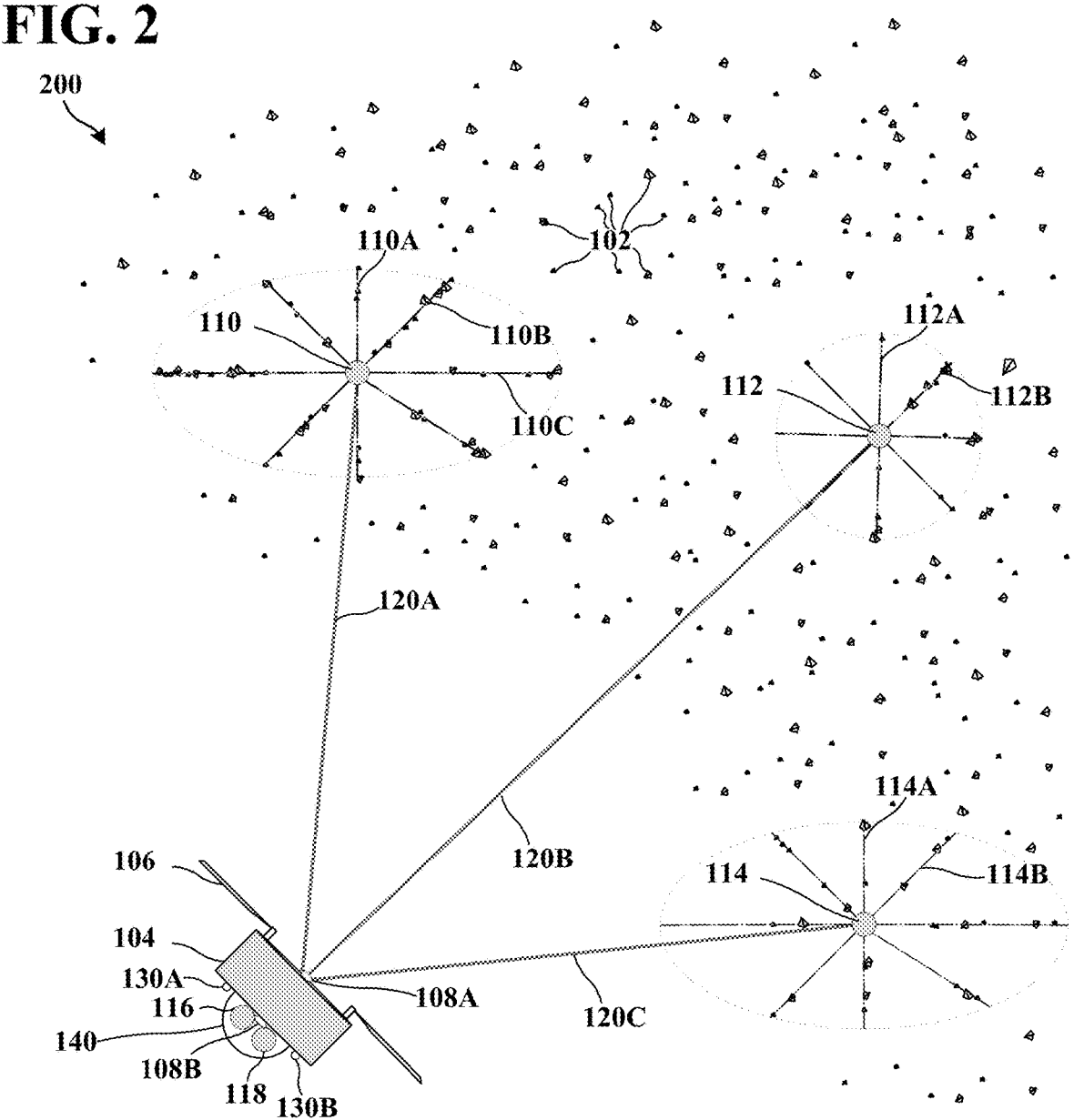
FIG. 2 illustrates an electrostatically charged debris collection system with a plurality of collectors having a plurality of electrostatically charged tendrils deployed into the path of detected debris.

In some embodiments, the plurality of tendrils (e.g., first set of tendrils 110A, 110B, 110C, second set of tendrils 112A, 112B, and third set of tendrils 114A, 114B) and/or the collectors (e.g., 110, 112, and 114) are electrostatically charged after being positioned in a path of the debris 102. For example, the plurality of tendrils (e.g., first set of tendrils 110A, 110B, 110C, second set of tendrils 112A, 112B, and third set of tendrils 114A, 114B) of the collectors (e.g., 110, 112, and 114) as depicted in FIG. 1 are not electrostatically charged and instead, are electrostatically charged after being positioned into the path of the debris 102 as depicted in FIG. 2. In some instances, not electrostatically charging the plurality of tendrils (e.g., first set of tendrils 110A, 110B, 110C, second set of tendrils 112A, 112B, and third set of tendrils 114A, 114B) of the collectors (e.g., 110, 112, and 114) as depicted in the example of FIG. 1 diminishes the attraction between the debris 102 and the plurality of tendrils (e.g., first set of tendrils 110A, 110B, 110C, second set of tendrils 112A, 112B, and third set of tendrils 114A, 114B), which often assists in positioning the plurality of tendrils (e.g., first set of tendrils 110A, 110B, 110C, second set of tendrils 112A, 112B, and third set of tendrils 114A, 114B) and/or the collectors (e.g., 110, 112, and 114) in the debris 102.

FIG. 2 illustrates an electrostatically charged debris collection system 200 with a plurality of collectors (e.g., 110, 112, and 114) each having a plurality of electrostatically charged tendrils (e.g., first set of tendrils 110A, 110B, 110C, second set of tendrils 112A, 112B, and third set of tendrils 114A, 114B) deployed into the path of detected debris 102. As the debris 102 approaches the tendrils, they are attracted to the electrostatic charge and stick to the tendrils' surfaces. In some embodiments, the tendrils (e.g., first set of tendrils 110A, 110B, 110C, second set of tendrils 112A, 112B, and third set of tendrils 114A, 114B) are made of flexible materials that allow them to bend and move to facilitate their movement towards the debris 102. In some embodiments, the tendrils (e.g., first set of tendrils 110A, 110B, 110C, second set of tendrils 112A, 112B, and third set of tendrils 114A, 114B) are coated with a variety of substances to improve their adhesive properties, such as specialized polymers or coatings with high surface energy.

In some embodiments, the plurality of tendrils (e.g., first set of tendrils 110A, 110B, 110C, second set of tendrils 112A, 112B, and third set of tendrils 114A, 114B) and/or the collectors (e.g., 110, 112, and 114) are electrostatically charged prior to being deployed into the path of the debris 102. In some instances, electrostatically charging the plurality of tendrils (e.g., first set of tendrils 110A, 110B, 110C, second set of tendrils 112A, 112B, and third set of tendrils 114A, 114B) of the collectors (e.g., 110, 112, and 114), as depicted in FIG. 2, increases the attraction between the debris 102 and the plurality of tendrils (e.g., first set of tendrils 110A, 110B, 110C, second set of tendrils 112A, 112B, and third set of tendrils 114A, 114B), which assists in attracting more debris 102.

The collected debris tend to cluster together as each particle of the debris 102 is attracted to and accumulate on the electrostatically charged tendrils (e.g., first set of tendrils 110A, 110B, 110C, second set of tendrils 112A, 112B, and third set of tendrils 114A, 114B), which often forms a dense and compact mass on the tendrils. This clustering effect leads to empty spaces forming between the tendrils, as the debris 102 is drawn towards the charged surface of the tendrils (e.g., first set of tendrils 110A, 110B, 110C, second set of tendrils 112A, 112B, and third set of tendrils 114A, 114B) rather than the space between the tendrils. As a result, the empty spaces generated between the tendrils provide a clear path in the debris field.

In some embodiments, the plurality of tendrils (e.g., first set of tendrils 110A, 110B, 110C, second set of tendrils 112A, 112B, and third set of tendrils 114A, 114B) and/or collectors (e.g., 110, 112, and 114) are arranged in patterns. For example, as depicted in FIG. 2, the plurality of tendrils of the first collector 110 (e.g., 110A, 110B, 110C) and the plurality of tendrils of the third collector 114 (e.g., 114A, 114B) are arranged in an ellipsoid pattern that distributes the electrical charge to attract the debris 102 more strongly in a first direction than in a second direction. Likewise, the plurality of tendrils of the second collector 112 (e.g., 112A, 112B) are arranged in a spherical pattern that evenly distributes the electrical charge to attract the debris 102 omni-directionally.

In some embodiments, the plurality of tendrils (e.g., first set of tendrils 110A, 110B, 110C, second set of tendrils 112A, 112B, and third set of tendrils 114A, 114B) correspond to wires or plates that are electrically connected to the electrostatic charging array. In some embodiments, the plurality of tendrils (e.g., first set of tendrils 110A, 110B, 110C, second set of tendrils 112A, 112B, and third set of tendrils 114A, 114B) are distinct from the electrostatic charging array. In some embodiments, the plurality of tendrils (e.g., first set of tendrils 110A, 110B, 110C, second set of tendrils 112A, 112B, and third set of tendrils 114A, 114B) are part of the electrostatic charging array. In some embodiments, the collectors (e.g., 110, 112, and 114) include one or more actuators configured to move any one of the one or more wires or plates of the plurality of tendrils (e.g., first set of tendrils 110A, 110B, 110C, second set of tendrils 112A, 112B, and third set of tendrils 114A, 114B) to enhance collection of the debris 102.

In some embodiments, the plurality of tendrils (e.g., first set of tendrils 110A, 110B, 110C, second set of tendrils 112A, 112B, and third set of tendrils 114A, 114B) are made of a flexible material. The flexible material is configured to facilitate movement of the plurality of tendrils (e.g., first set of tendrils 110A, 110B, 110C, second set of tendrils 112A, 112B, and third set of tendrils 114A, 114B) towards the debris 102 or facilitate a movement of the debris 102 towards the plurality of tendrils (e.g., first set of tendrils 110A, 110B, 110C, second set of tendrils 112A, 112B, and third set of tendrils 114A, 114B). In some embodiments, the flexible material corresponds to Kevlar, nylon, carbon fiber, silicone, rubber, polyurethane, thermoplastic, or elastomers.

In some embodiments, the plurality of tendrils (e.g., first set of tendrils 110A, 110B, 110C, second set of tendrils 112A, 112B, and third set of tendrils 114A, 114B) include carbon nanotubes, which are highly conductive and have a large surface area, providing an ideal substrate for electrostatic charging.

It should be appreciated that the collectors (e.g., 110, 112, and 114) can include additional features to enhance debris collection. For example, in some embodiments, the collectors (e.g., 110, 112, and 114) include a magnetic field generator (e.g., permanent magnet, electromagnet, etc.) to attract ferromagnetic debris (e.g., iron, nickel, cobalt, neodymium, samarium, magnetite, alloys, etc.) or include a heating element to melt ice or other frozen debris before it is collected. In some embodiments, the collectors (e.g., 110, 112, and 114) include a mechanism for ejecting (e.g., deorbiting) collected debris once it reaches a certain capacity or when the debris is no longer needed.

Figure 3:
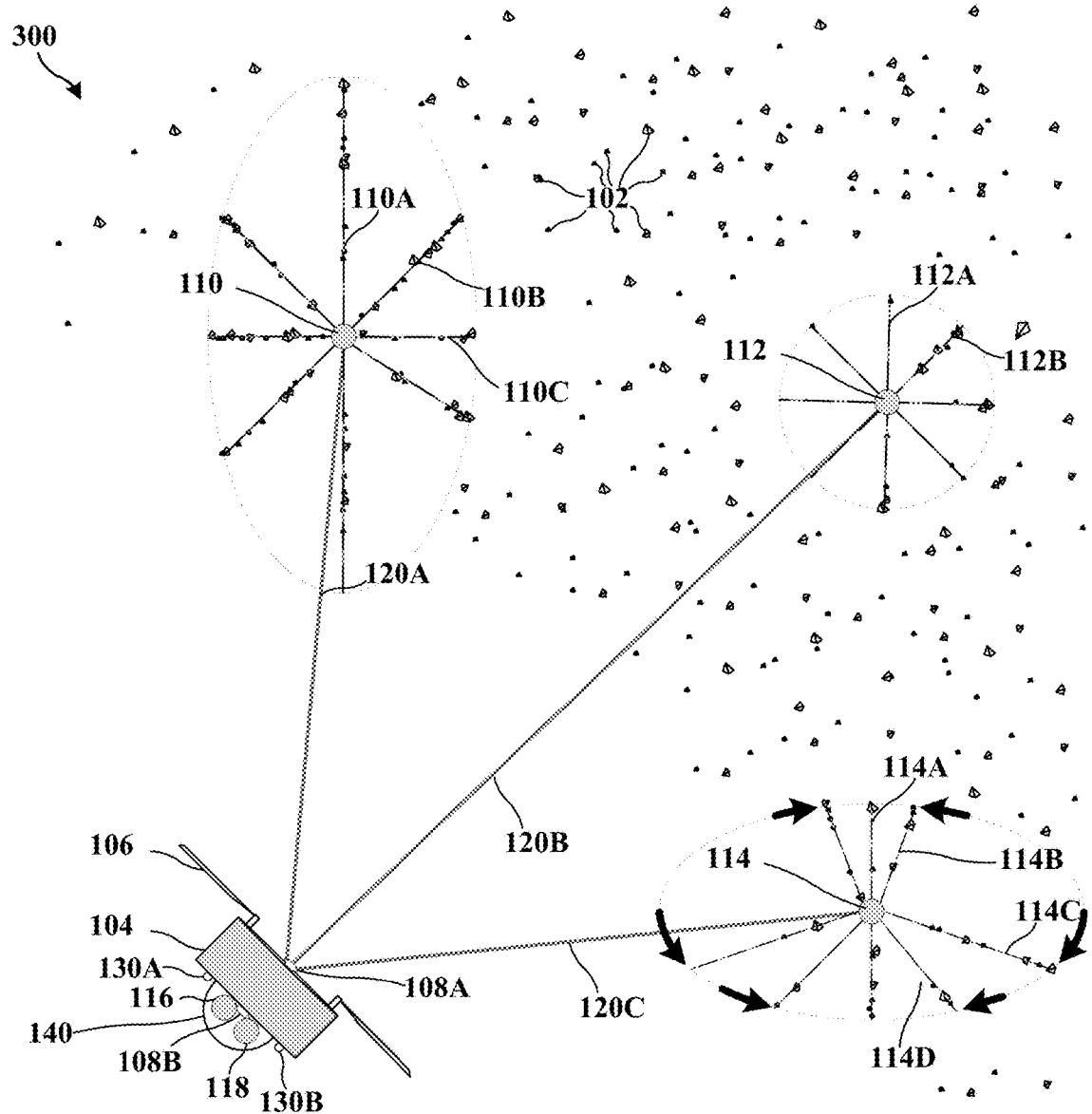
FIG. 3 illustrates an electrostatically charged debris collection system with a plurality of electrostatically charged collectors and a plurality of electrostatically charged tendrils that are arrangeable.

FIG. 3 illustrates an arrangeable electrostatically charged debris collection system 300 with a plurality of electrostatically charged collectors (e.g., 110, 112, and 114) and a plurality of electrostatically charged tendrils (e.g., first set of tendrils 110A, 110B, 110C, second set of tendrils 112A, 112B, and third set of tendrils 114A, 114B) that are arrangeable. As depicted in FIG. 3, the tendrils (e.g., first set of tendrils 110A, 110B, 110C, second set of tendrils 112A, 112B, and third set of tendrils 114A, 114B) of the collectors (e.g., 110, 112, and 114) are moveable to form symmetric and asymmetrical patterns. Asymmetrical patterns are formed by skewing the position, length, or orientation of the tendrils (e.g., first set of tendrils 110A, 110B, 110C and third set of tendrils 114A, 114B). For example, FIG. 3 depicts moving the individual tendrils of the third set of tendrils 114A, 114B of one half of the ellipsoid of the third collector 114 close together while the tendrils the other half of the ellipsoid of third collector 114 are more spread out. This arrangement creates an electrostatic pattern that distributes the electrical charge on the collector (e.g., third collector 114) asymmetrically in such a way that debris 102 is attracted more strongly in a first direction than in a second direction. The asymmetrical distribution of the tendrils (e.g., third set of tendrils 114A, 114B) helps to concentrate the debris 102 in a particular area, making the debris 102 easier to collect.

Some benefits of an asymmetrical pattern include the ability to more precisely direct the movement of debris 102, particularly in situations where there is a prevailing wind or current (e.g., solar wind in space). In creating a stronger attraction in one direction, the debris 102 is more likely to be collected in the desired location. Additionally, asymmetrical patterns are useful in adapting to obstacles or debris 102 of different sizes and shapes because the non-uniform distribution of electrical charge can more effectively collect a variety of debris 102.

It should be appreciated that the tendrils (e.g., first set of tendrils 110A, 110B, 110C, second set of tendrils 112A, 112B, and third set of tendrils 114A, 114B) are controlled (e.g., processors 710) to move independently, if desired, to form symmetrical and asymmetrical patterns. In such instances, motors, actuators, or other mechanical means are implemented to move the tendrils (e.g., first set of tendrils 110A, 110B, 110C, second set of tendrils 112A, 112B, and third set of tendrils 114A, 114B). In some embodiments, the tendrils are made from a shape memory material (e.g., Nitinol) that is configured to change the shape of the tendrils with a specific stimulus (e.g., voltage, current, temperature, pressure, etc.).

In contrast to asymmetrical patterns, symmetrical patterns are formed by evenly positioning, length, or orientation of the tendrils. For example, FIG. 3 depicts a symmetrical pattern of the second set of tendrils (112A, 112B) that are evenly distributed in a spherical pattern around the collector (e.g., second collector 112). Symmetrical patterns are often a more efficient use of the collector's electrostatic charging array, as the electrical charge is evenly distributed across the tendrils (e.g., second set of tendrils 112A, 112B). As a result, the symmetrical pattern often improves the overall effectiveness of the debris collection system and reduces the amount of time required to clear a given area. In addition, symmetrical patterns often reduce the likelihood of damage to the debris collection system, as the more even distribution balances the stress across the tendrils (e.g., second set of tendrils 112A, 112B).

In some embodiments, the tendrils (e.g., first set of tendrils 110A, 110B, 110C, second set of tendrils 112A, 112B, and third set of tendrils 114A, 114B) of the collectors (e.g., 110, 112, and 114) are arranged in a symmetrical radial pattern, which is a symmetrical pattern where the tendrils extend outward from the center of the collector in a radial pattern, similar to the spokes of a wheel. This pattern is helpful in attracting the debris 102 from all directions, which is useful in areas with high debris density.

In some embodiments, the tendrils (e.g., first set of tendrils 110A, 110B, 110C, second set of tendrils 112A, 112B, and third set of tendrils 114A, 114B) of the collectors (e.g., 110, 112, and 114) are arranged in a symmetrical circular pattern: In this symmetrical pattern, the tendrils are arranged in concentric circles around the center of the collector. This pattern is useful in collecting debris 102 in a circular area, such as around a particular object or in a circular debris field.

In some embodiments, the tendrils (e.g., first set of tendrils 110A, 110B, 110C, second set of tendrils 112A, 112B, and third set of tendrils 114A, 114B) of the collectors (e.g., 110, 112, and 114) are arranged in a symmetrical grid pattern, where the tendrils are arranged in a grid-like pattern, with tendrils extending both horizontally and vertically. This pattern is useful in collecting debris 102 in a rectangular or square area.

The specific pattern and configuration of the tendrils (e.g., first set of tendrils 110A, 110B, 110C, second set of tendrils 112A, 112B, and third set of tendrils 114A, 114B) of the collectors (e.g., 110, 112, and 114) can be customized based on various factors, such as the type of debris 102, the expected direction of the debris 102, and the environment in which the collector (e.g., 110, 112, and 114) will be deployed.

In addition to the previously mentioned patterns, there are other interesting configurations of the tendrils (e.g., first set of tendrils 110A, 110B, 110C, second set of tendrils 112A, 112B, and third set of tendrils 114A, 114B) that are used to optimize debris collection. For example, in some embodiments, the tendrils (e.g., first set of tendrils 110A, 110B, 110C, second set of tendrils 112A, 112B, and third set of tendrils 114A, 114B) are arranged in a spiral or helix pattern, similar to a DNA molecule. In some embodiments, the tendrils (e.g., first set of tendrils 110A, 110B, 110C, second set of tendrils 112A, 112B, and third set of tendrils 114A, 114B) are arranged in a spiral pattern to collect debris in a circular path around the collector. This configuration often helps to increase the collection of smaller debris particles that may be more difficult to capture using a straight or radial arrangement of tendrils.

In some embodiments, the tendrils (e.g., first set of tendrils 110A, 110B, 110C, second set of tendrils 112A, 112B, and third set of tendrils 114A, 114B) are arranged in a linear pattern to collect debris in a straight line. In some embodiments, the tendrils (e.g., first set of tendrils 110A, 110B, 110C, second set of tendrils 112A, 112B, and third set of tendrils 114A, 114B) can be arranged in a V-shaped pattern to collect debris 102 in a specific direction, such as towards the front of the collectors (e.g., 110, 112, and 114). This can be useful in situations where the debris is expected to be coming from a specific direction, such as in the case of satellite collisions or debris from a specific launch.

In other embodiments, the tendrils (e.g., first set of tendrils 110A, 110B, 110C, second set of tendrils 112A, 112B, and third set of tendrils 114A, 114B) are arranged in a zigzag pattern, which often helps to ensure that debris 102 is collected from a wider area around the collectors (e.g., 110, 112, and 114). In other embodiments, tendrils (e.g., first set of tendrils 110A, 110B, 110C, second set of tendrils 112A, 112B, and third set of tendrils 114A, 114B) are arranged in a random or chaotic pattern, which is particularly effective for collecting debris 102 that is moving in unpredictable patterns.

It should be appreciated that often the tendrils (e.g., first set of tendrils 110A, 110B, 110C, second set of tendrils 112A, 112B, and third set of tendrils 114A, 114B) are arranged to optimize the collection of different types of debris 102 or to accommodate different environmental conditions. In some embodiments, the tendrils (e.g., first set of tendrils 110A, 110B, 110C, second set of tendrils 112A, 112B, and third set of tendrils 114A, 114B) include one or more magnetic field generators (e.g., permanent magnet, electromagnet, etc.) to attract ferromagnetic debris (e.g., iron, nickel, cobalt, neodymium, samarium, magnetite, alloys, etc.).

In some embodiments, the length, thickness, and material of the tendrils (e.g., first set of tendrils 110A, 110B, 110C, second set of tendrils 112A, 112B, and third set of tendrils 114A, 114B) are adjusted based on the type of debris 102 being collected. For example, in some embodiments, if the debris 102 is expected to be small and light, the tendrils (e.g., first set of tendrils 110A, 110B, 110C, second set of tendrils 112A, 112B, and third set of tendrils 114A, 114B) deployed can be thinner and/or shorter to increase the likelihood of capturing the debris 102. In some embodiments, if the debris 102 is expected to be larger and heavier, the tendrils (e.g., first set of tendrils 110A, 110B, 110C, second set of tendrils 112A, 112B, and third set of tendrils 114A, 114B) are configured to be thicker and longer to increase the strength of the electrostatic attraction.

It should be appreciated that various means to move the tendrils (e.g., first set of tendrils 110A, 110B, 110C, second set of tendrils 112A, 112B, and third set of tendrils 114A, 114B) of the collectors (e.g., 110, 112, and 114) can be implemented. For example, in some embodiments, the tendrils (e.g., first set of tendrils 110A, 110B, 110C, second set of tendrils 112A, 112B, and third set of tendrils 114A, 114B) include thrusters (e.g., similar to thruster 130A, thruster 130B) or propulsion stabilizers 716 to move the tendrils into position. In some embodiments, the tendrils include a robotic arm or a boom to move the tendrils into position. In some embodiments, the tendrils (e.g., first set of tendrils 110A, 110B, 110C, second set of tendrils 112A, 112B, and third set of tendrils 114A, 114B) include electrostatic plates or wire that are polarized to move the tendrils into position. In some embodiments, the electrostatic plates or wire are adjacent to one or more magnetic field generators (e.g., permanent magnet, electromagnet, etc.) to attract ferromagnetic debris (e.g., iron, nickel, cobalt, neodymium, samarium, magnetite, alloys, etc.) In some embodiments, tendrils (e.g., first set of tendrils 110A, 110B, 110C, second set of tendrils 112A, 112B, and third set of tendrils 114A, 114B) include the electrostatic plates or wires distinct from tendrils (e.g., first set of tendrils 110A, 110B, 110C, second set of tendrils 112A, 112B, and third set of tendrils 114A, 114B) include that include one or more magnetic field generators (e.g., permanent magnet, electromagnet, etc.) to attract ferromagnetic debris (e.g., iron, nickel, cobalt, neodymium, samarium, magnetite, alloys, etc.).

Figure 4:
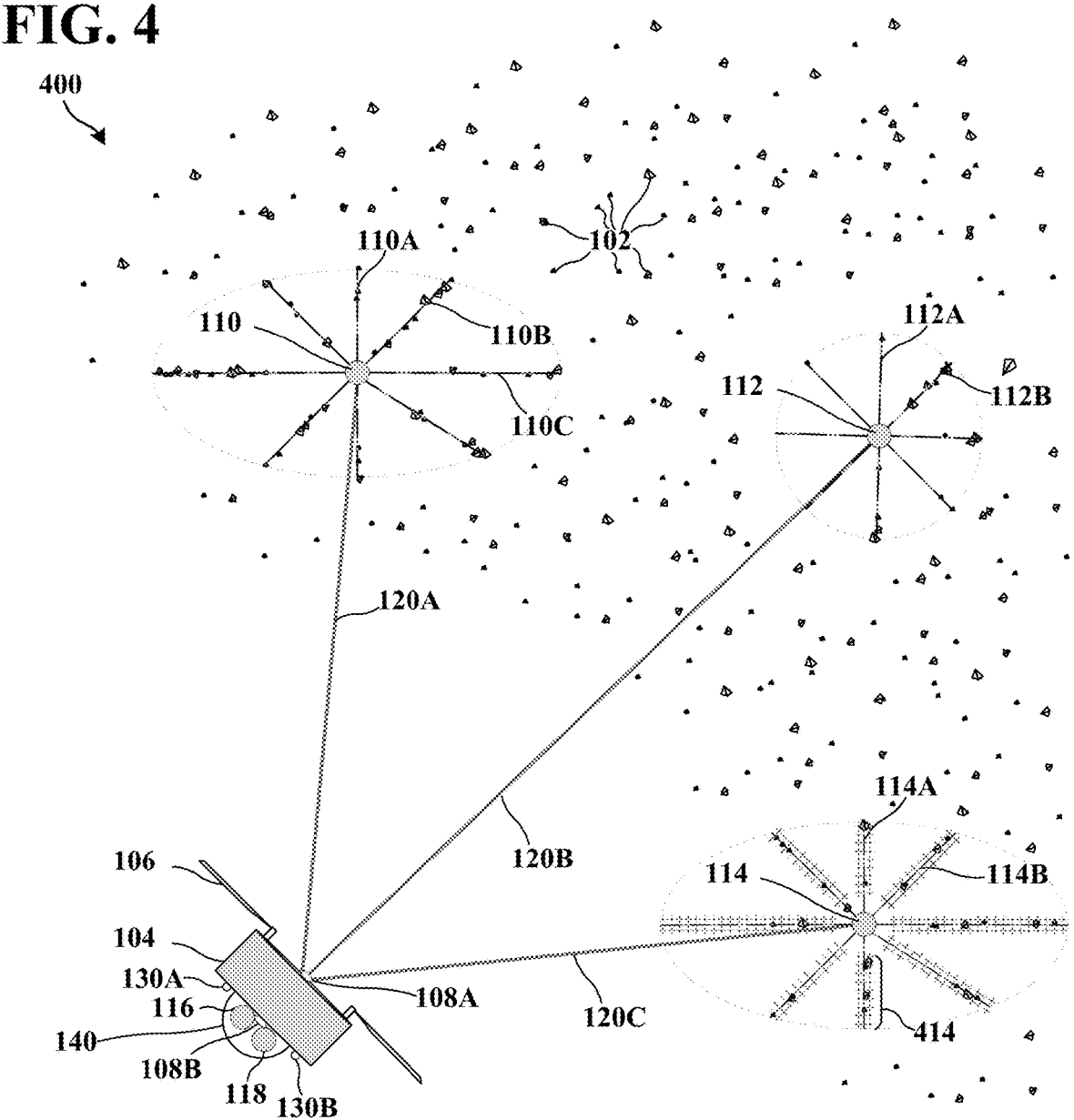
FIG. 4 illustrates an electrostatically charged debris collection system with a plurality of electrostatically charged tendrils that are coated with a material to enhance electrostatic charging.

FIG. 4 illustrates an electrostatically charged debris collection system 400 with a plurality of electrostatically charged tendrils (e.g., first set of tendrils 110A, 110B, 110C, second set of tendrils 112A, 112B, and third set of tendrils 114A, 114B) that are coated with a material 414 to enhance electrostatic charging. In some embodiments, the coating material 414 corresponds to a conductor coating (e.g., copper, aluminum, silver, gold, etc.) that enhances the electrostatic charging effect. In some embodiments, the coating material 414 corresponds to an insulator coating (e.g., diamond, nylon, etc.) that enhances the electrostatic storing effect. In some embodiments, the coating material 414 corresponds to a semiconductor coating (e.g., germanium, silicon, gallium arsenide, etc.) that balances the electrostatic charging effect with the electrostatic storing effect.

In some embodiments, the coating material 414 corresponds to a low-friction coating, such as polytetrafluoroethylene (PTFE) to reduce drag and improve the efficiency of the collector. In some embodiments, an anti-static coating, such as a polymer blend, is applied to the plurality of tendrils (e.g., first set of tendrils 110A, 110B, 110C, second set of tendrils 112A, 112B, and third set of tendrils 114A, 114B) to even out the buildup of the static electricity. In some embodiments, coating material 414 is a single layer. In some embodiments, coating material 414 is multi-layered (e.g., conductor, semiconductor, insulator, low-friction, anti-static, or any combination thereof etc.).

In some embodiments, the tendrils (e.g., first set of tendrils 110A, 110B, 110C, second set of tendrils 112A, 112B, and third set of tendrils 114A, 114B) are coated with material 414 corresponding to a thin layer of metal or a conductive polymer to improve their conductivity and increase their ability to attract debris 102. In some embodiments, coating material 414 corresponds to a corrosion resistant material to withstand degradation from exposure to the harsh environments (e.g., space).

Fibrous hairs coating often improves the efficiency and effectiveness in collecting debris 102 from various surfaces and environments and it should be appreciated that the coating material 414 on the electrostatically charged tendrils often include such fibrous hairs. In some embodiments, the fibrous hairs of the coating material 414 are made of polymers, and are designed to have a particular shape, size, and stiffness. The fibrous hairs on the tendrils (e.g., third set of tendrils 114A, 114B) increase the surface area of the tendrils (e.g., third set of tendrils 114A, 114B), which enhances the ability to attract and collect debris 102. Additionally, the small size and flexibility of the fibrous hairs facilitate movement of the tendrils (e.g., third set of tendrils 114A, 114B) to follow the contours of the debris 102, which aids in the collection process.

In lieu of fibrous hairs, in some embodiments, the plurality of tendrils (e.g., third set of tendrils 114A, 114B) of the collector (e.g., third collector 114) include wires or plates of the tendrils that are coated with a material 414 to enhance the charging of the electrostatic charging array, as depicted in FIG. 4. In some embodiments, the coating material 414 of the wires or plates corresponds to a conductor coating (e.g., copper, aluminum, silver, gold, etc.) that enhances the electrostatic charging effect. In some embodiments, the coating material 414 of the wires or plates corresponds to an insulator coating (e.g., diamond, nylon, etc.) that enhances the electrostatic storing effect. In some embodiments, the coating material 414 of the wires or plates corresponds to a semiconductor coating (e.g., germanium, silicon, gallium arsenide, etc.) that balances the electrostatic charging effect with the electrostatic storing effect. In some embodiments, the coating material 414 of the wires or plates corresponds to a low-friction coating, such as polytetrafluoroethylene (PTFE) or a polymer blend to reduce drag and improve the efficiency of the collectors (e.g., 110, 112, 114). In some embodiments, an anti-static coating is applied to the wires or plates to even out the buildup of static electricity. In some embodiments, coating material 414 is a single layer. In some embodiments, coating material 414 of the wires or plates is multi-layered (e.g., conductor, semiconductor, insulator, low-friction, anti-static, or any combination thereof etc.). In some embodiments, coated tendrils (e.g., first set of tendrils 110A, 110B, 110C, second set of tendrils 112A, 112B, and third set of tendrils 114A, 114B) are deployed in combination with the non-coated tendrils (e.g., first set of tendrils 110A, 110B, 110C, second set of tendrils 112A, 112B, and third set of tendrils 114A, 114B) of the collectors (e.g., 110, 112, 114).

Figure 5:
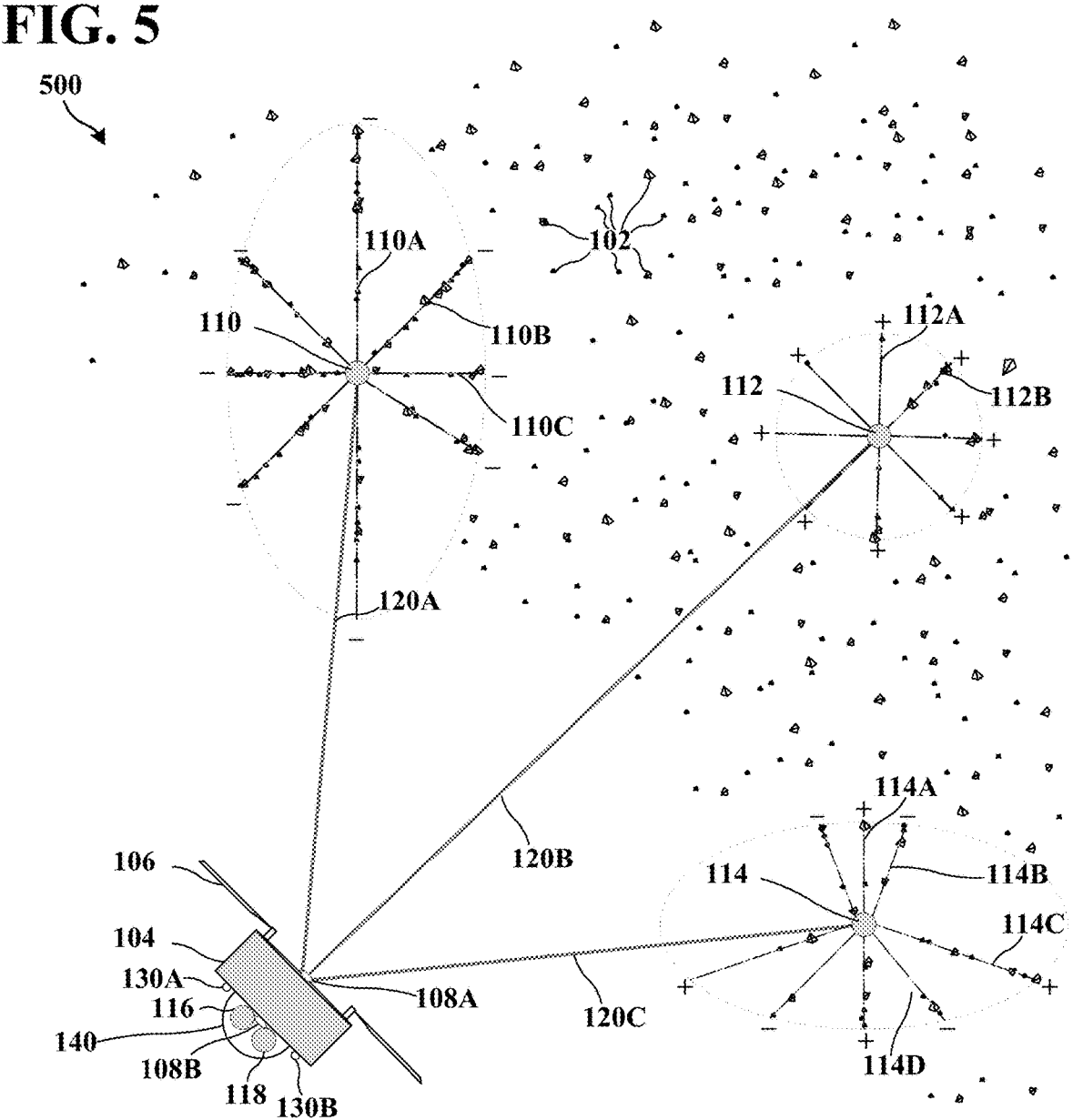
FIG. 5 illustrates an electrostatically charged debris collection system with a plurality of electrostatically charged collectors and a plurality of electrostatically charged tendrils arranged in different sets of voltage and polarity that are adjusted independently.

FIG. 5 illustrates an electrostatically charged debris collection system 500 with a plurality of an electrostatically charged collectors (e.g., 110, 112, and 114) and a plurality of electrostatically charged tendrils (e.g., first set of tendrils 110A, 110B, 110C, second set of tendrils 112A, 112B, and third set of tendrils 114A, 114B) arranged in different sets of voltage and polarity that are adjusted independently. The ability to adjust the voltage and polarity of each tendril independently provides greater flexibility in capturing different types of debris 102, such as those with varying charge properties. For example, a positively charged tendril may be more effective in capturing debris with a negative charge, while a negatively charged tendril may be more effective in capturing debris with a positive charge.

The ability to adjust the voltage and polarity of each tendril independently is useful in situations where the debris being collected has a particular shape or distribution, as it allows the collector to be optimized for that specific type of debris. For example, if the debris being collected is mostly flat and thin, such as leaves or paper, the tendrils can be configured to form a pattern that increases the collection area while decreasing the likelihood of the debris slipping through the gaps between the tendrils. Conversely, if the debris is more irregular in shape, such as rocks or broken glass, the tendrils can be configured to form a pattern that concentrates the electrostatic force on a smaller area to increase the collection accuracy while decreasing the risk of damaging the collector.

During operation, the debris collection system 500 first detects the presence of debris 102, and preferably detects the charge on the debris 102. Based on the detected charge information, the system activates the appropriate collectors with adjusted voltage and polarity to capture the debris 102. For example, when positively charged debris 102 is detected, the system applies a negative charge to the plurality of tendrils of collector 112 to attract the positively charged debris 102, as shown in FIG. 5. Similarly, when negatively charged debris 102 is detected, the system applies a positive charge to the plurality of tendrils of collector 112 to attract the negatively charged debris 102, as shown in FIG. 5. For debris 102 with intermixed positive charged particles and negative charged particles, the system detects the polarity of the charged particles and applies a negative charge to tendrils of collector 114 located near positive charged particles and a positive charge to tendrils of collector 114 located near negative charged particles to attract the charged debris 102, as shown in FIG. 5. Independently adjusting the charge and polarity of the tendrils enhances the system's capability to capture a wide range of debris 102 with different charge properties, thereby increasing the efficiency and effectiveness of the debris collection process.

In addition to attracting particles, in some embodiments, the debris collection system 500 adjusts the voltage and polarity of the collectors (e.g., 110, 112, and 114) and the plurality of tendrils (e.g., third set of tendrils 114A, 114B) of the collector (e.g., third collector 114) to repel debris 102 particles using electrostatic repulsion. Electrostatic repulsion is useful in directing the debris to a particular collector or tendril. For example, if a negatively charged particle is detected near a positively charged tendril, the system activates the negatively charged tendrils nearby to repel the particle towards the desired collector. In adjusting the voltage and polarity of each tendril independently, the debris collection system effectively controls the movement of debris 102 and ensures that it is directed towards the appropriate collector for safe removal.

In some embodiments, two or more collectors (e.g., 110, 112) work together in a coordinated manner to capture debris 102. For example, when two or more collectors (e.g., 110, 112) are used, one or more collectors (e.g., 110) act as a 'broom' to direct debris 102 towards a second collector acting (e.g., 112) as a 'dustpan' to collect and store the debris. Coordinating the actions of multiple collectors is often more efficient and effective in capturing debris 102 and is particularly useful when dealing with large or irregularly shaped debris 102, as it allows the collectors (e.g., 110, 112, 114) to work together to capture debris 102 that might otherwise be missed or difficult to capture with a single collector.

Figure 6:
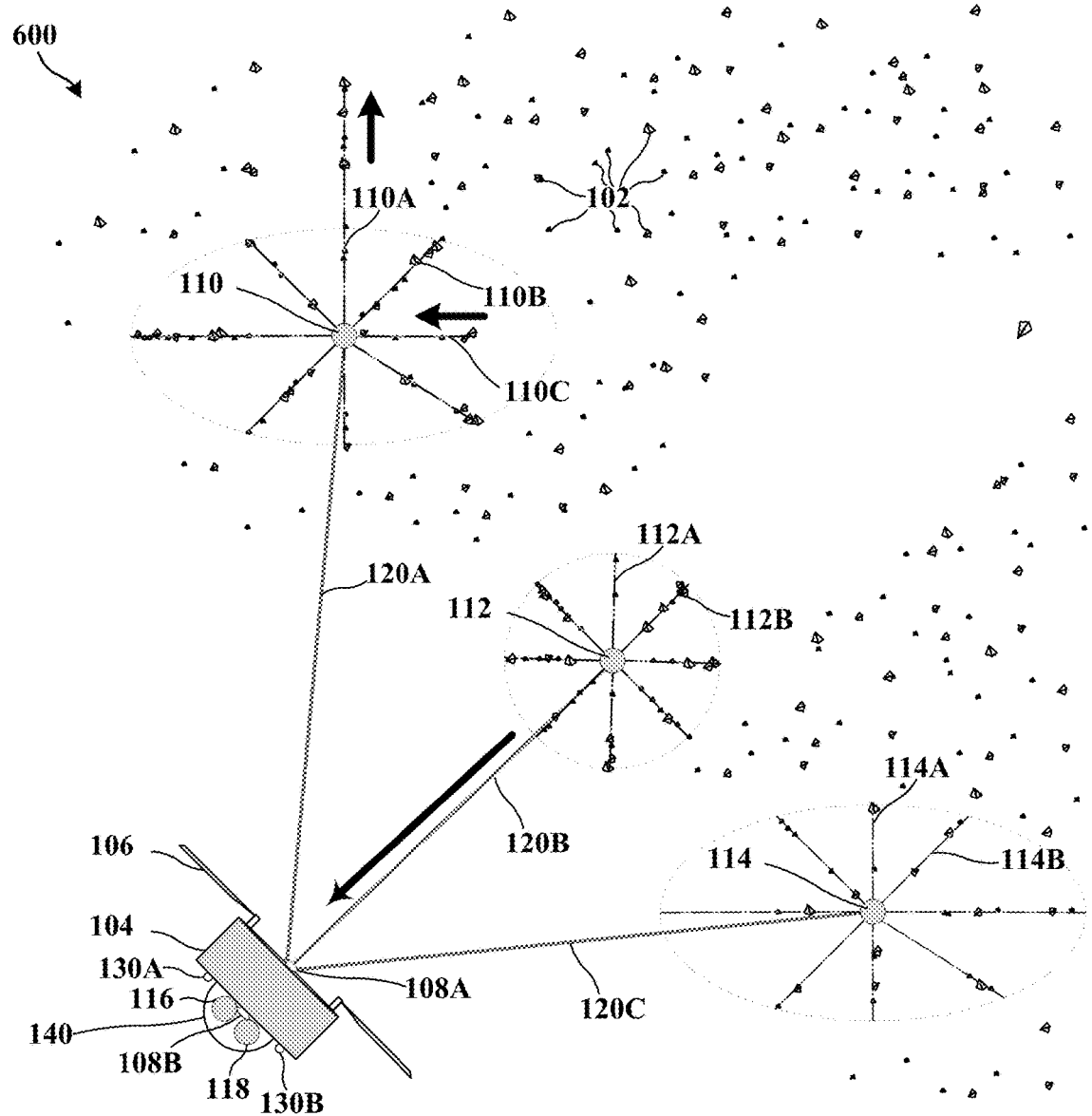
FIG. 6 illustrates an electrostatically charged debris collection system with extendable and retractable tendrils and couplers.

FIG. 6 illustrates an electrostatically charged debris collection system 600 with extendable and retractable tendrils and couplers. This debris collection system 600 provides greater flexibility and control over how debris 102 is collected by allowing independent extension and retraction of the first set of tendrils 110A, 110B, 110C, second set of tendrils 112A, 112B, and third set of tendrils 114A, 114B, as well as the couplers 120A, 120B, and 120C. For example, in FIG. 6, the deployed coupler 120B connected to the second collector 112 is retracted into the apparatus, causing the second collector 112 to be drawn towards the apparatus 104. In some embodiments, a complete retraction of the coupler 120B repositions the second collector 112 on the apparatus 104, allowing at least a portion of the deployment mechanism 108A to rest.

The plurality of tendrils, including the first set of tendrils 110A, 110B, 110C, second set of tendrils 112A, 112B, and third set of tendrils 114A, 114B, are capable of extending and retracting. For example, when a tendril such as 110A extends, it can reach debris 102 that was previously out of reach, attract and collect the debris onto the tendril 110A. Conversely, when tendrils, such as tendril 110B, retract, previously collected debris 102 will cluster together more closely. In some embodiments, a filter 140 is attached to the collector, such as collector 110, at the retraction point to remove the debris from the tendrils, such as tendril 110B, as the tendril is retracted. This extension and retraction flexibility allows the debris collection system 600 to adapt to different types of debris 102 and their distribution in space.

FIG. 6 also depicts that one or more of the pluralities of the electrostatically charged tendrils, including the first set of tendrils 110A, 110B, 110C, second set of tendrils 112A, 112B, and third set of tendrils 114A, 114B, are extendable and retractable. It should be appreciated that any of the couplers, including couplers 120A, 120B, and 120C, are independently extendable and retractable, and any of the electrostatically charged tendrils are independently extendable and retractable.

In some embodiments, extendable and retractable tendrils (e.g., first set of tendrils 110A, 110B, 110C, second set of tendrils 112A, 112B, and third set of tendrils 114A, 114B) include multiple sections that are individually controlled to optimize the collection of debris 102 in different areas of the collector. In such embodiments, the outermost sections of the tendrils (e.g., first set of tendrils 110A, 110B, 110C, second set of tendrils 112A, 112B, and third set of tendrils 114A, 114B) are extended to increase the collection area, which is often useful in situations where there is a large amount of debris that needs to be collected quickly. At the same time, in such embodiments, the innermost sections of the tendrils (e.g., first set of tendrils 110A, 110B, 110C, second set of tendrils 112A, 112B, and third set of tendrils 114A, 114B) are retracted to improve the accuracy of the collection, which is often helpful in cases where the debris 102 is smaller and more spread out. In some embodiments, individual control of the tendril's sections are integrated into the feedback loop of collector controller 714, allowing the system to adjust the tendrils based on the real-time data from the one or more sensors. This makes the system more adaptable to changing conditions and improve the overall performance of the apparatus 104.

Additionally, in FIG. 6, the coupler 120B is shown retracting, causing the debris 102 that was collected on collector 112 to be drawn back towards the apparatus 104. As this happens, the debris 102 is further consolidated onto the tendrils, such as tendrils 112A, 112B, of the collector 112. This results in a clear path of collected debris 102 on the tendrils of the collector 112, enabling efficient movement of the collector back to the apparatus for further processing, such as debris removal.

Once debris 102 has been collected on the tendrils, the collection system 600 deploys various mechanisms to dislodge the debris and direct it towards a collector (e.g., 110, 112, 114) or other disposal mechanism. These mechanisms include electrostatic repulsion, vibration, or other physical means. The filters 140 and collectors, including collectors 110, 112, or other suitable components, may be used to gather the dislodged debris for further processing or disposal.

In some embodiments, the filters 140 are designed to retract the tendrils (e.g., first set of tendrils 110A, 110B, 110C, second set of tendrils 112A, 112B, and third set of tendrils 114A, 114B) into the collectors (e.g., 110, 112, and 114) through small holes that use brushes to "sweep" the collected debris 102 away from the respective tendril and the collector (e.g., 110, 112, 114). The "clamshell" filter 140 is electrostatically charged to attract the debris 102, which then collects on the inner wall of the filter 140. When the filter 140 is retracted, the debris 102 can be removed from the inner wall and stored in a more compact container (e.g., a compactor) before being discharged (e.g., deorbited) from the apparatus 104.

In some embodiments, the debris collection system 600 include sensors or detectors to monitor the status of the debris collection, such as the amount of debris 102 collected, the type or size of debris collected, or the condition of the collection components. This information is often used to optimize the performance of the collection system, such as adjusting the collection parameters or scheduling maintenance activities.

Figure 7:
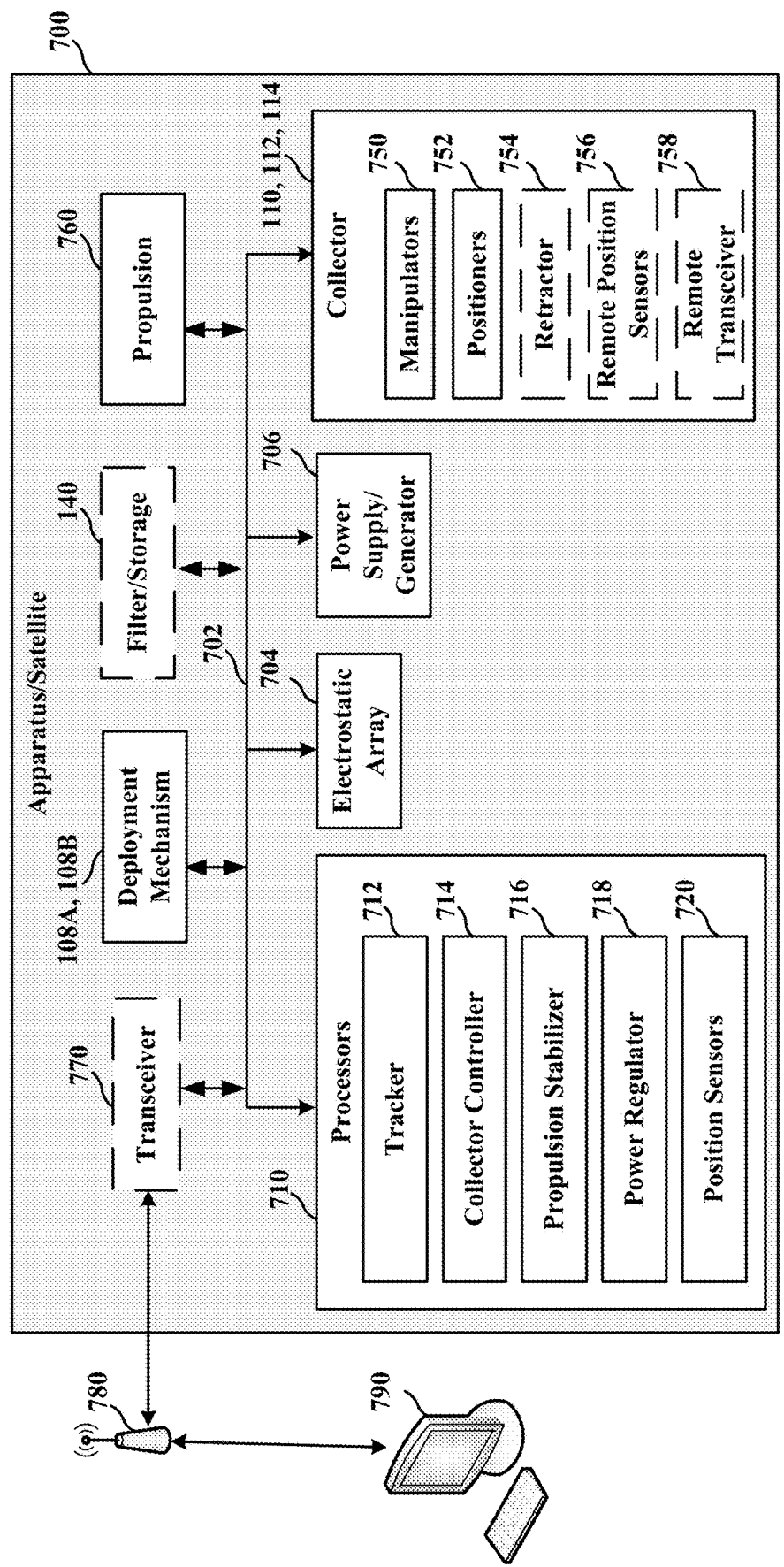
FIG. 7 is a schematic or diagram illustrating an exemplary electrostatically charged collector with a plurality of tendrils for collecting debris in space or other environments.

FIG. 7 is a schematic or diagram illustrating an exemplary electrostatically charged collector (e.g., 110, 112, 114) with a plurality of tendrils for collecting debris in space or other environments. The apparatus 104 represented by the apparatus/satellite 700, is implemented with bus architecture, denoted as bus 702, which interconnects various circuits including one or more processors and/or hardware components, represented by the electrostatic array 704, power supply/generator 706, propulsion 760, deployment mechanisms (e.g., 108A, 108B), collectors (e.g., 110, 112, 114), processors 710 and optional transceiver 770, optional repeater 780, optional base station 790, and an optional filter/storage 140. The collectors (e.g., 110, 112, 114) include manipulators 750, the positioners 752, and an optional retractor 754, an optional remote position sensor 756, and an optional remote transceiver 758. The bus 702 also links various other circuits such as timing sources, peripherals, voltage regulators, and power management circuits, which are well known in the art.

The processors 710 include a tracker 712 configured to track the position of debris 102 relative to the collectors (e.g., 110, 112, and 114) and/or the position of the tendrils (e.g., first set of tendrils 110A, 110B, 110C, second set of tendrils 112A, 112B, and third set of tendrils 114A, 114B). The tracker 712 monitors the movement of debris 102 in relation to the collectors 110, 112, and 114, as well as the positioning of the tendrils 110A, 110B, 110C, 112A, 112B, 114A, and 114B to optimize the debris collection process.

The processors 710 include a collector controller 714 configured to control the collectors (e.g., 110, 112, 114) and the tendrils, including positioning (e.g., extending and retracting) the tendrils. In some embodiments, the processors 710 are configured to adjust the tendrils based on specific conditions, such as when a certain amount of debris 102 has been collected or when the collection efficiency drops below a certain threshold. The processors 710 may receive feedback from one or more sensors to determine when to adjust the tendrils. For instance, if sensor data from one or more sensors indicates that the debris 102 is concentrated in a particular area, the processors 710 may extend the tendrils in the concentrated area to enhance the collection efficiency. The collector controller 714 in processors 710 monitors the collection process and adjusts the positioning of the collectors 110, 112, 114 and the tendrils based on feedback from sensors, such as extending the tendrils in areas with high debris concentration to optimize collection efficiency.

The processors 710 include a propulsion stabilizer 716 configured to adjust the position of the tendrils, such as the first set of tendrils 110A, 110B, 110C, the second set of tendrils 112A, 112B, and the third set of tendrils 114A, 114B. The propulsion stabilizer 716 may use various mechanisms to control the position of the tendrils, such as thrusters, reaction wheels, or other propulsion systems, to maintain stability and control during the collection process. The propulsion stabilizer 716 in processors 710 utilizes thrusters to make precise adjustments to the position of the tendrils, ensuring stable and controlled movement during debris collection operations.

The processors 710 include a power regulator 718 configured to regulate the power from the power supply/generators and the batteries (not shown) to ensure efficient power distribution and management within the apparatus/satellite 700. The power regulator 718 monitors and controls the power supply from the power supply/generators and batteries to maintain stable and efficient power distribution throughout the apparatus/satellite 700, ensuring proper functioning of all components.

In some embodiments, solar panels are used to provide power to the power regulator 718. In some embodiments, the collectors (110, 112, 114) include an array of solar cells integrated into its surface to convert sunlight into electricity to power the various subsystems. The solar cells are often optimized to operate in the specific conditions of the environment where the collector (e.g., 110, 112, and 114) will be deployed, such as in low Earth orbit or on the surface of the Moon. In some embodiments, the collectors (110, 112, 114) include batteries and/or a nuclear reactor to provide power. The batteries are charged using solar panels and/or the nuclear reactor, and then used to power the collector's various subsystems. Regardless of the power source used, the collectors (e.g., 110, 112, and 114) and/or apparatus 104 are designed to be highly efficient and self-sustaining, allowing it to operate for extended periods of time without the need for maintenance or refueling.

The processors 710 include position sensors 720 configured to accurately detect the location, trajectory, and other relevant information of the debris 102. The position sensors 720 communicate sensory data with one or more processors 710 to activate the deployment mechanisms (e.g., 108A and 108B) or adjust the position of the collectors (e.g., 110, 112, and 114) in response to the detected debris location and trajectory. The position sensors 720 utilize advanced imaging or tracking technology to precisely detect the position, velocity, and direction of the debris 102, allowing the processors 710 to dynamically adjust the collection strategy and activate the deployment mechanisms or collectors accordingly. The position sensors 720 often include one more imaging devices, optical/infrared/ultraviolet camera, lidar, radar, optical or acoustic, which use lasers to create a 3D map of the surrounding environment, to help the apparatus navigate and locate debris 102. In some embodiments, the position sensors 720 include infrared sensors, laser sensors, or radar sensors, and the like.

The collector controller 714 is configured to communicate with the collectors (e.g., 110, 112, and 114) to dynamically adjust the extension and retraction of the tendrils based on real-time feedback from the sensors. For instance, the collector controller 714 can dynamically extend or retract the tendrils in response to changes in debris density, velocity, or environmental conditions such as wind or current. By constantly adapting the tendrils' extension and retraction in real-time, the collectors (e.g., 110, 112, and 114) can optimize debris collection efficiency and overall performance. The collector controller 714 employs advanced algorithms and sensor feedback to dynamically control the extension and retraction of the tendrils, allowing for precise and adaptive adjustments that optimize the collection process and enhance the overall performance of the collectors (e.g., 110, 112, and 114).

The collectors (e.g., 110, 112, and 114) include manipulators 750 configured to precisely adjust the position of the tendrils (e.g., first set of tendrils 110A, 110B, and 110C; second set of tendrils 112A and 112B; and third set of tendrils 114A and 114B). The manipulators 750 are equipped with advanced actuators or robotic arms that allow for fine-tuned adjustments of the tendrils' position, orientation, and movement to optimize debris collection efficiency and ensure effective debris capture. The manipulators 750 utilize precision actuators (e.g., robotic arms) with multiple degrees of freedom, allowing them to dynamically adjust the position and orientation of the tendrils to efficiently collect debris from various directions and trajectories.

The collectors (e.g., 110, 112, and 114) include positioners 752 configured to precisely adjust the position of the collectors (e.g., 110, 112, and 114) and the tendrils (e.g., first set of tendrils 110A, 110B, and 110C; second set of tendrils 112A and 112B; and third set of tendrils 114A and 114B). The positioners 752 are equipped with propulsion mechanisms, such as propellant, jet or fluid propulsion, to achieve the desired movement. In addition, the positioners 752 may utilize motors, servos, or pneumatic/hydraulic actuators to extend and/or retract the tendrils, allowing for dynamic adjustments to adapt to different debris scenarios and optimize the debris collection process for improved efficiency and effectiveness. The positioners 752 utilize propellant-based propulsion and advanced motorized actuators, allowing for precise and dynamic adjustments of the collectors (e.g., 110, 112, and 114) and tendrils to swiftly respond to changing debris conditions and environmental factors, resulting in optimized debris collection.

The collectors (e.g., 110, 112, and 114) are equipped with retractors 754 that are configured to precisely retract or extend the collectors (e.g., 110, 112, and 114) and/or the tendrils (e.g., first set of tendrils 110A, 110B, and 110C; second set of tendrils 112A and 112B; and third set of tendrils 114A and 114B). The retractors 754 are designed with advanced mechanisms that allow for controlled and accurate retraction or extension of the collectors (e.g., 110, 112, and 114) and/or tendrils as needed, providing flexibility and adaptability to different debris scenarios and operational requirements. The retractors 754 incorporate precision-engineered mechanisms, such as motorized actuators or hydraulic/pneumatic systems, that enable smooth and controlled retraction or extension of the collectors and/or tendrils, ensuring precise positioning and optimized performance in various debris collection scenarios.

The collectors (e.g., 110, 112, and 114) are equipped with remote position sensors 756 that are configured to accurately detect and monitor the location and trajectory of the debris 102. The remote position sensors 756 communicate the sensory data to one or more processors 710, which then utilize the data to precisely control the movement of the collectors (e.g., 110, 112, and 114) and/or the tendrils (e.g., first set of tendrils 110A, 110B, and 110C; second set of tendrils 112A and 112B; and third set of tendrils 114A and 114B). The remote position sensors 756 incorporate technologies, such as GPS or radar, that enable accurate detection and tracking of debris location and trajectory in real-time, providing critical data for precise control of collectors (e.g., 110, 112, and 114) and tendrils during the debris removal process.

The remote position sensors 756 often include one or more imaging devices, optical/infrared/ultraviolet camera, lidar, radar, optical or acoustic, which use lasers to create a 3D map of the surrounding environment, to help the apparatus navigate and locate debris 102. In some embodiments, the remote position sensors 756 include infrared sensors, laser sensors, or radar sensors, and the like.

The collectors (e.g., 110, 112, and 114) are equipped with a remote transceiver 758 that is configured to enable bi-directional communication of operational data and control commands with one or more processors 710. The remote transceiver 758 facilitates the seamless transmission and receipt of data and commands between the collectors (e.g., 110, 112, and 114) and the processors 710, enabling efficient and effective control of the debris removal process. The remote transceiver 758 employs state-of-the-art wireless communication technologies, such as satellite or cellular communication, to transmit real-time operational data and receive precise control commands from the processors 710, enabling seamless and reliable communication for control of the collectors (e.g., 110, 112, and 114) during debris removal operations.

The deployment mechanisms (e.g., 108A, 108B) of the apparatus 104 are configured to deploy the first collector 110, the second collector 112, and the third collector 114, which are part of the plurality of collectors, strategically into the path of the debris 102 for efficient collection. The deployment mechanisms (e.g., 108A, 108B) utilize advanced robotic arms or automated systems to precisely position and release the first collector 110, the second collector 112, and the third collector 114 at strategic locations along the trajectory of the debris 102, ensuring coverage and effectiveness in debris collection.

The propulsion 760 of the apparatus 104 is configured to facilitate the movement of the apparatus 104 in order to effectively collect debris 102 within the predefined area. Examples of propulsion 760 include thrusters or other means of locomotion that enable the apparatus to navigate the environment. The movement of the collector (e.g., 110, 112, and 114) is controlled by the processors 710 (e.g., a microcontroller or computer system), which is programmed to follow a specific path or pattern. The processors 710, which include the propulsion stabilizers 716, enable the apparatus 104 and collectors (e.g., 110, 112, 114), including the tendrils, to efficiently move to different locations and collect debris 102 over a larger area.

The filter/storage 140 of the apparatus 104 is configured to filter and retain the collected debris 102 prior to being discharged or deorbited. Examples of filter/storage 140 include mesh filters or other mechanisms that prevent the debris 102 from escaping the apparatus 104. The retained debris 102 can be periodically discharged from the collector (e.g., 110, 112, and 114) through a designated discharge port or other mechanism. In some embodiments, the filter/storage 140, consisting of fine mesh filters that prevent even small debris particles from escaping, ensures that the collected debris 102 is effectively filtered and retained within the apparatus 104 until it can be properly discharged or deorbited.

The transceiver 770 of the apparatus 104 is configured to facilitate the transmission and reception of operational data and control commands from a remote device, such as a remote base station 790. Examples of operational data and control commands that are transmitted and received by the transceiver 770 include controlling the position, voltage, polarity, and pattern of the tendrils, as well as controlling the movement of the collectors (e.g., 110, 112, 114). The transceiver 770 is operatively coupled to the collectors (e.g., 110, 112, 114) to enable remote control and monitoring of the apparatus 104. The transceiver 770 provides communication for precise control of the position, voltage, polarity, and pattern of the tendrils, as well as the movement of the collectors (e.g., 110, 112, 114) for efficient debris collection.

In some embodiments, the transceiver 770 and the remote transceiver 758 are configured to relay communications with the collectors (e.g., 110, 112, 114) to move to a specific location, either by manual commands or through automated algorithms based on the current location of the collectors (e.g., 110, 112, 114), the location of the debris, and other environmental factors. This feature is particularly useful for space applications, where the apparatus 104 tracks the collectors' (e.g., 110, 112, 114) location and adjusts the collectors' (e.g., 110, 112, 114) trajectory to collect debris from a particular region of space. The communications relayed through the transceiver 770 and the remote transceiver 758 adds versatility and flexibility to the electrostatically charged collector (e.g., 110, 112, and 114), allowing it to adapt to changing environmental conditions and optimize its performance for specific types of debris 102.

In addition to communication with the apparatus 104 and the collectors (e.g., 110, 112, 114), the transceiver implements a variety of communication protocols, such as radio frequency (RF) or infrared (IR). The choice of communication protocol will depend on a variety of factors, such as the range of communication needed and the level of interference in the environment where the apparatus 104 and the collectors (e.g., 110, 112, 114) will be used. For example, RF communication is often used for longer range communications or through obstacles. In contrast, IR communication is often used in short distance or in relatively open environments and where interference from other devices is a concern.

The transceiver 770 and the remote transceiver 758 are equipped with a variety of antennas to optimize its range and directionality. In some embodiments, the transceiver 770 and the remote transceiver 758 include a directional antenna to increase the range of communication in a particular direction. In some embodiments, the transceiver 770 and the remote transceiver 758 include an omnidirectional antenna to provide 360-degree coverage. The choice of antenna depends on the specific needs of the apparatus 104 and the collectors (e.g., 110, 112, 114).

FIG. 8 is a flow chart that illustrates the steps involved in collecting debris using an electrostatically charged collector (e.g., 110, 112, and 114) with a plurality of tendrils. The method 800 begins with detecting the location and trajectory of the debris using one or more sensors, such as cameras, lidar, or radar sensors, to track the debris in relation to the collector (e.g., 110, 112, and 114), as shown in step 802. For example, a camera sensor may capture images of the debris in the vicinity of the collector (e.g., 110, 112, and 114) and determine its location and trajectory for further processing. Camera sensors provide visual information used to identify and locate specific types of debris, such as large pieces of debris or hazardous materials. Lidar sensors provide a more precise 3D map of the debris 102.

Once the location and trajectory of the debris have been detected, the collector (e.g., 110, 112, and 114) is deployed into the path of the detected debris, as shown in step 804. This may be achieved using actuators (e.g., a robotic arm, a boom, or any other mechanism) that allow precise positioning of the collector (e.g., 110, 112, and 114) in the path of the debris 102.

Next, one or more tendrils of the plurality of tendrils are electrostatically charged to attract the debris 102 to the collector (e.g., 110, 112, and 114), as shown in step 806. The tendrils may be arranged in a pattern that distributes the electrical charge on the collector (e.g., 110, 112, and 114) to attract the debris more strongly in a first direction than in a second direction. For example, the tendrils may be configured to form a cone-shaped pattern with higher charge density towards the center to enhance the attraction of debris towards the collector (e.g., 110, 112, and 114). Additionally, the voltage and polarity of the one or more tendrils of the plurality of tendrils may be adjusted to optimize debris accumulation. This adjustment is often based on characteristics of the debris being collected. For example, if the debris is small and light, a higher voltage may be used to ensure that it is attracted to the collector (e.g., 110, 112, and 114).

In some embodiments, one or more tendrils of the plurality of tendrils may be coated with a material, such as a conductive coating, to enhance electrostatic charging. Additionally, the one or more processors may prioritize the collection of certain types of debris based on pre-programmed criteria. For instance, the processor may prioritize the collection of larger debris or debris of a certain type based on predefined criteria to optimize the collection process. The predefined criteria may instruct the collector to collect debris that is of a certain size or weight, or that has a particular shape or composition. For example, the collector may be programmed to collect debris that is larger than a certain threshold size, as larger debris may pose a greater threat to spacecraft or other objects in space. Alternatively, the collector may be programmed to collect debris that is composed of a certain material, such as metal or plastic, which may be more likely to cause damage upon impact.

Additionally, the collector may be programmed to avoid collecting debris that is not a threat or that may interfere with other operations. For instance, the collector may be instructed not to collect debris that is below a certain size threshold, as smaller debris may not pose a significant risk. Overall, pre-programmed criteria can help to optimize the collector's performance and ensure that it is collecting the most important and relevant debris.

In other embodiments, one or more tendrils of the plurality of tendrils move independently to optimize debris collection as shown in step 808 of the flow chart. For instance, the tendrils may be adjusted in real-time based on the detected debris location and trajectory to effectively capture debris from different directions. The ability to adjust each set of tendrils independently is useful in situations where the debris 102 is located in specific areas or patterns. For instance, when debris is concentrated in one area, the tendrils in that area are set to a higher voltage and polarity to focus the electrostatic force on that area, while the other tendrils are set to a lower voltage and polarity to reduce their influence on the targeted area. Additionally, one or more of the plurality of tendrils are extendable and retractable based on the characteristics and amount of debris being collected as shown in step 810 of the flow chart. For example, the tendrils can be programmed to extend to a certain length when collecting larger debris like leaves or paper, and retract when collecting smaller debris like dust or hair. This configuration assists in collecting different types of debris. This ensures that the collector (e.g., 110, 112, and 114) can accommodate different types of debris, such as larger debris.

As shown in step 812 of the flow chart, the voltage and polarity of the one or more tendrils of the plurality of tendrils are adjusted to form an electrostatic pattern to optimize debris accumulation. For example, if the debris being collected is composed of lightweight particles, such as small plastic particles in a marine environment, the voltage and polarity of the tendrils are adjusted to create a concentrated electrostatic field in a specific configuration that is effective in attracting and capturing such particles. This configuration is often a tightly spaced arrangement of tendrils with higher voltage and opposite polarity, creating a strong attractive force that pulls the debris 102 towards the collector (e.g., 110, 112, and 114). If the debris 102 being collected is larger and heavier, such as debris 102 from a construction site, the electrostatic patterns are often adjusted to cover a wider area with lower voltage and same polarity to ensure effective attraction and capture of the debris 102.

Once the debris 102 has been attracted to the collector (e.g., 110, 112, and 114), it is captured and retained before discharging from the apparatus, as shown in step 814 of the flow chart. The captured debris may be stored in a collection container or compartment within the collector (e.g., 110, 112, and 114) for later disposal. In some embodiments, the collector (e.g., 110, 112, and 114) moves using a propulsion system to collect debris in a predefined area. For example, the collector (e.g., 110, 112, and 114) is equipped with thrusters or other means of mobility to navigate a defined area and collect debris from different locations.

In some embodiments, the collector (e.g., 110, 112, and 114) transmits and receives operational data and control commands from a remote device using a transceiver 770 operatively coupled to the collector (e.g., 110, 112, and 114), as shown in step 816 of the flow chart. This allows the operator to monitor and control the collector (e.g., 110, 112, and 114) from a remote location. For example, the collector (e.g., 110, 112, and 114) may be equipped with sensors that provide real-time data on the status of the debris collection process, such as the amount of debris collected, the efficiency of debris capture, and the performance of the electrostatic charging system. This data is often transmitted to a remote device, such as a control center or a mobile device, allowing the operator to remotely monitor and assess the performance of the collector (e.g., 110, 112, and 114). In addition, control commands are sent from the remote device to the collector (e.g., 110, 112, and 114) to adjust various parameters, such as the voltage and polarity of the tendrils, the movement pattern of the collector (e.g., 110, 112, and 114), and the extension or retraction of the tendrils, to optimize the debris collection process based on real-time conditions.

Finally, as shown in step 818 of the flow chart, the collector (e.g., 110, 112, and 114) moves to collect debris from a different area once the debris in the predefined area has been collected. This allows the collector (e.g., 110, 112, and 114) to cover a larger area and collect debris from multiple locations. Once the debris 102 in that area has been collected, the collector (e.g., 110, 112, and 114) is repositioned to a different location with the help of a propulsion system, such as a thruster, to continue the debris collection process in a new area. Additionally, during the movement of the collector (e.g., 110, 112, and 114), the one or more tendrils of the plurality of tendrils are extended or retracted to form an electrostatic pattern that optimizes the collection efficiency based on the anticipated type and distribution of debris in the new area. This allows the collector (e.g., 110, 112, and 114) to adapt to changing debris 102 conditions and increase its collection performance. Additionally, the one or more tendrils of the plurality of tendrils may be extended or retracted to form an electrostatic pattern that distributes the electrical charge on the collector (e.g., 110, 112, and 114) to attract the debris more strongly in a first direction than in a second direction, as shown.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other examples. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various examples described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C § 112(f) unless the element is expressly recited using the phrase "means for."

What is claimed is:

1. An apparatus for collecting debris, comprising:
   a collector with one or more wires or plates, wherein the collector is configured to accumulate debris on the one or more wires or plates;
   a deployment mechanism configured to move the collector into a path of the debris;
   an electrostatic charging array connected by a coupler to the collector, wherein the electrostatic charging array is configured to deliver an electrostatic charge to the one or more wires or plates; and
   one or more processors operatively coupled to the collector, the deployment mechanism, and the electrostatic charging array, the one or more processors are configured to:
   track debris in relation to the collector;
   control movement of the collector and the deployment mechanism; and
   regulate the electrostatic charge delivered to the one or more wires or plates.

2. The apparatus of claim 1, wherein the one or more wires or plates are arranged in a pattern that distributes the electrical charge to attract the debris more strongly in a first direction than in a second direction.

3. The apparatus of claim 1, wherein the one or more wires or plates are made of a material that facilitates their movement towards the debris or facilitate movement of the debris towards the one or more wires or plates.

4. The apparatus of claim 1, wherein the one or more processors are configured to adjust a voltage and polarity of any one of the one or more wires or plates independently.

5. The apparatus of claim 1, wherein the collector includes one or more actuators configured to move any one of the one or more wires or plates.

6. The apparatus of claim 1, wherein at least one of the one or more wires or plates is coated with an electrostatic charge enhancing material.

7. The apparatus of claim 1, further comprising: a filter operatively coupled to the collector, wherein the filter is configured to remove the debris from the one or more wires or plates and store the debris until the debris is discharged from the apparatus.

8. The apparatus of claim 1, wherein the one or more processors are configured to prioritize collection of certain types of debris based on pre-programmed criteria.

9. An apparatus for collecting debris, comprising:
a collector with a plurality of retractable tendrils, wherein the collector is configured to accumulate debris on the plurality of retractable tendrils;
a deployment mechanism configured to move the collector into a path of the debris;
an electrostatic charging array connected by a coupler to the collector, wherein the electrostatic charging array is configured to deliver an electrostatic charge to the plurality of retractable tendrils; and
one or more processors operatively coupled to the collector, the deployment mechanism, and the electrostatic charging array, the one or more processors are configured to:
track debris in relation to the collector;
control movement of the collector, the retractable tendrils, and the deployment mechanism; and
regulate the electrostatic charge delivered to the plurality of retractable tendrils.

10. The apparatus of claim 9, wherein one or more retractable tendrils of the plurality of retractable tendrils are configured to extend or retract independently.

11. The apparatus of claim 9, wherein the one or more processors are configured to extend or retract one or more retractable tendrils of the plurality of retractable tendrils to form an electrostatic pattern that distributes the electrical charge to attract the debris more strongly in a first direction than in a second direction.

12. The apparatus of claim 9, wherein the one or more processors are configured to adjust a voltage and polarity of a first retractable tendril of the plurality of retractable tendrils differently from a second retractable tendril of the plurality of retractable tendrils.

13. The apparatus of claim 9, wherein the one or more processors are configured to adjust a voltage and polarity of one or more retractable tendrils of the plurality of retractable tendrils to form an electrostatic pattern.

14. The apparatus of claim 9, wherein one or more retractable tendrils of the plurality of retractable tendrils are coated with an electrostatic charge enhancing material.

15. The apparatus of claim 9, further comprising a filter operatively coupled to the collector, the filter is configured to remove the debris from the plurality of retractable tendrils and store the debris until the debris is discharged from the apparatus.

16. The apparatus of claim 9, wherein the one or more processors are further configured to prioritize collection of certain types of debris based on pre-programmed criteria.

17. An apparatus for collecting debris, comprising:
a collector with a plurality of tendrils, wherein the collector is configured to accumulate debris on the plurality of tendrils, and wherein at least one of the plurality of tendrils includes one or more actuators for independent movement in at least three orthogonal directions;
a deployment mechanism configured to move the collector into a path of the debris;
an electrostatic charging array connected by a coupler to the collector, wherein the electrostatic charging array is configured to deliver an electrostatic charge to the plurality of tendrils; and
one or more processors operatively coupled to the collector, the deployment mechanism, and the electrostatic charging array, the one or more processors are configured to:
track debris in relation to the collector;
control movement of the collector, the plurality of tendrils, and the deployment mechanism; and
regulate the electrostatic charge delivered to the plurality of tendrils.

18. The apparatus of claim 17, wherein one or more of the plurality of tendrils are configured to extend or retract independently.

19. The apparatus of claim 18, wherein the one or more processors are configured to extend or retract the one or more of the plurality of tendrils to form an electrostatic pattern that distributes an electrical charge to attract the debris more strongly in a first direction than in a second direction.

20. The apparatus of claim 17, further comprising: one or more electromagnets operatively coupled to the one or more processors, respectively;
wherein the one or more processors are configured to activate the electromagnets to generate a magnetic field to attract the debris more strongly in a first direction than in a second direction.

21. The apparatus of claim 17, wherein the one or more processors are configured to adjust a voltage and polarity of any one of the plurality of tendrils independently.

22. The apparatus of claim 17, wherein the one or more processors are configured to adjust a voltage and polarity of one or more of the tendrils to form an electrostatic pattern.

23. The apparatus of claim 17, wherein one or more of the plurality of tendrils are coated with an electrostatic charge enhancing material.

24. The apparatus of claim 17, further comprising a filter operatively coupled to the collector, wherein the filter is configured to remove the debris from the plurality of tendrils and store the debris until the debris is discharged from the apparatus.

25. The apparatus of claim 17, wherein the one or more processors are configured to prioritize collection of certain types of debris based on pre-programmed criteria.

26. The apparatus of claim 1, wherein one or more wires or plates of the collector include an adhesive coating configured to improve retention of debris upon contact.

27. The apparatus of claim 9, wherein one or more of the retractable tendrils of the collector include an adhesive coating configured to improve retention of debris upon contact.

28. The apparatus of claim 17, wherein one or more of the tendrils of the collector include an adhesive coating configured to improve retention of debris upon contact.

29. The apparatus of claim 1, wherein one or more wires or plates of the collector include fibrous hairs configured to accumulate and enhance retention of debris upon contact.

30. The apparatus of claim 9, wherein one or more of the retractable tendrils of the collector include fibrous hairs configured to accumulate and enhance retention of debris upon contact.

31. The apparatus of claim 17, wherein one or more of the tendrils of the collector include fibrous hairs configured to accumulate and enhance retention of debris upon contact.

* * * * *